US012093398B2

(12) United States Patent
McGraw et al.

(10) Patent No.: US 12,093,398 B2
(45) Date of Patent: Sep. 17, 2024

(54) VULNERABILITY ANALYSIS AND REPORTING FOR EMBEDDED SYSTEMS

(71) Applicant: RAM Laboratories, Inc., San Diego, CA (US)

(72) Inventors: Robert Michael McGraw, Del Mar, CA (US); John Darragh Geddes, San Diego, CA (US)

(73) Assignee: RAM Laboratories, Inc., San Diego, CA (US)

( * ) Notice: Subject to any disclaimer, the term of this patent is extended or adjusted under 35 U.S.C. 154(b) by 289 days.

(21) Appl. No.: 17/537,720

(22) Filed: Nov. 30, 2021

(65) Prior Publication Data

US 2022/0335135 A1     Oct. 20, 2022

Related U.S. Application Data

(60) Provisional application No. 63/119,530, filed on Nov. 30, 2020.

(51) Int. Cl.
    *G06F 21/00*      (2013.01)
    *G06F 11/36*      (2006.01)
    *G06F 21/57*      (2013.01)

(52) U.S. Cl.
    CPC ........ *G06F 21/577* (2013.01); *G06F 11/3684* (2013.01)

(58) Field of Classification Search
    CPC .............. G06F 21/577; G06F 11/3684; G06F 2221/033; G06F 11/3688; G06F 11/3636; G06N 3/0475; G06N 3/126; G06N 20/00
    See application file for complete search history.

(56) References Cited

U.S. PATENT DOCUMENTS

2016/0232081 A1*   8/2016   Copos ................ G06F 11/3688
2018/0365139 A1*   12/2018   Rajpal ..................... G06N 5/01

* cited by examiner

*Primary Examiner* — Jeffrey C Pwu
*Assistant Examiner* — Helai Salehi
(74) *Attorney, Agent, or Firm* — Genius Patent APC; Bruce Hare

(57) ABSTRACT

An embedded software analyzer (ESA) detects vulnerabilities in software, such as embedded software items (e.g., software that is pre-loaded onto a device or component). Vulnerabilities may include flaws, glitches, weaknesses, and/or other elements that may prevent correct operation or allow an attacker to access or exploit the software (and/or associated devices, components, systems, etc.) The ESA may utilize techniques such as fuzzing and symbolic execution to identify vulnerabilities. The ESA may predict vulnerabilities and prioritize analysis based on the prediction. The ESA may use smart seeding to optimize fuzzing or other analysis. Such smart seeding may include generating optimized inputs for a particular software item. The ESA may apply machine learning to perform, optimize, and/or otherwise implement such analysis techniques.

15 Claims, 18 Drawing Sheets

VULNERABILITY ANALYSIS AND REPORTING FOR EMBEDDED SYSTEMS

CROSS-REFERENCE TO RELATED APPLICATIONS

This application claims priority to U.S. Provisional Patent Application Ser. No. 63/119,530, filed on Nov. 30, 2020.

STATEMENT REGARDING FEDERALLY SPONSORED RESEARCH OR DEVELOPMENT

This invention was made with government support under FA9453-17-C-0471 awarded by the United States Air Force. The government has certain rights in the invention.

BACKGROUND

Many components or devices utilize embedded software. System developers may not have access to source code associated with such embedded software.

Therefore there exists a need for a way to detect vulnerabilities in binary software components.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide an embedded software analyzer (ESA) that may detect vulnerabilities in software, such as embedded software items (e.g., software that is pre-loaded onto a device or component). Vulnerabilities may include flaws, glitches, weaknesses, and/or other elements that may prevent correct operation or allow an attacker to access or exploit the software (and/or associated devices, components, systems, etc.) The ESA may utilize techniques such as fuzzing and symbolic execution to identify vulnerabilities. In some embodiments, the ESA may predict vulnerabilities and prioritize analysis based on the prediction. The ESA may use smart seeding to optimize fuzzing or other analysis. Such smart seeding may include generating optimized inputs for a particular software item. The ESA may apply machine learning to perform, optimize, and/or otherwise implement such analysis techniques.

Many examples herein may discuss memory vulnerabilities. One of ordinary skill in the art will recognize that such examples may be applied to various other types of vulnerabilities (e.g., code injection, uncontrolled format string, etc.).

Figure 1:
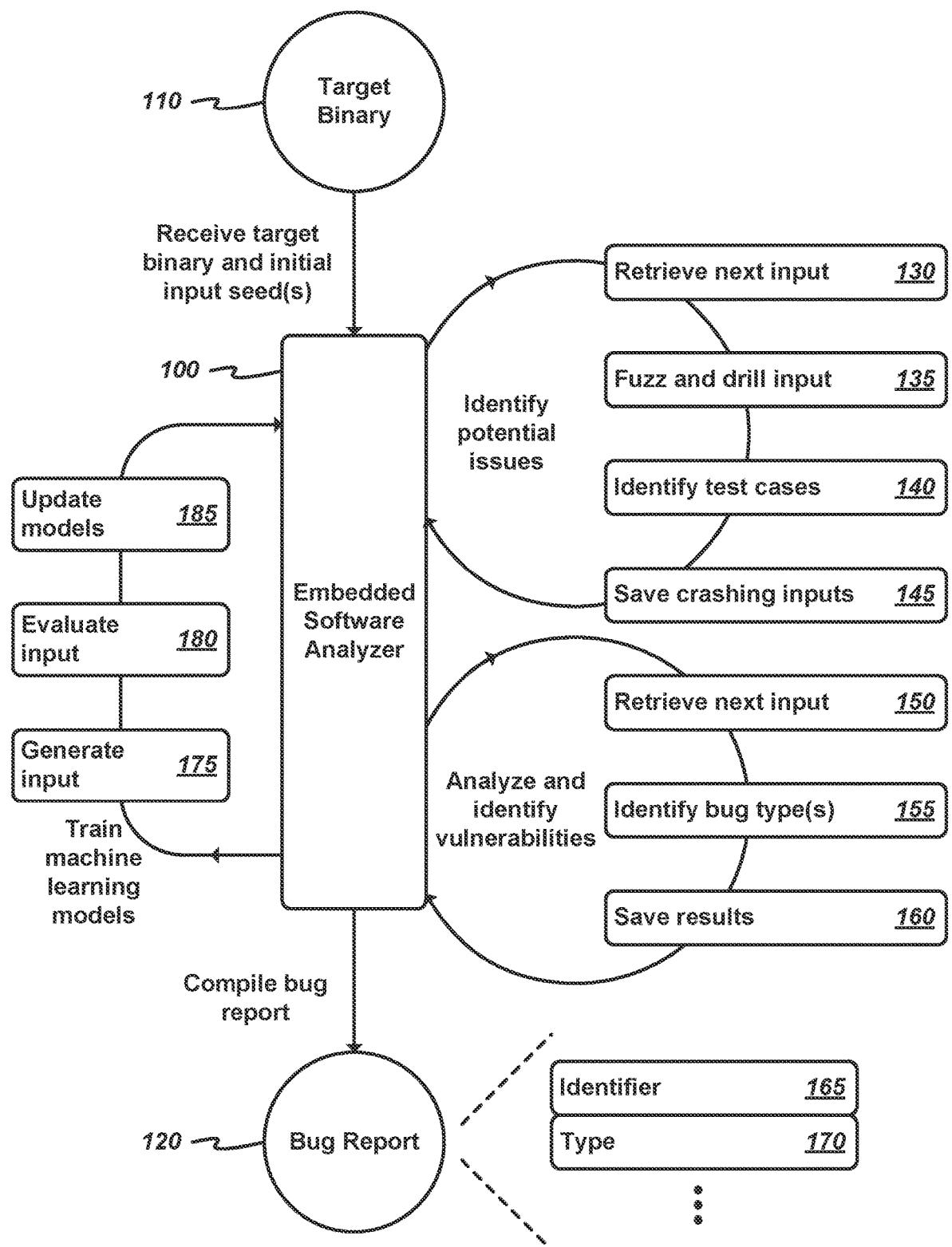
FIG. 1 illustrates an example overview of one or more embodiments described herein, in which a target binary is analyzed to detect vulnerabilities.

FIG. 1 illustrates an example overview of one or more embodiments described herein, in which the ESA 100 analyzes a target binary 110 to detect vulnerabilities and generate a bug report 120.

ESA 100 may be implemented using various systems, devices, etc., depending on the attributes of target binary 110. For example, ESA 100 may be implemented using or via an architecture such as an embedded hardware component (e.g., an internet of things (IoT) device), an enterprise component (e.g., a laptop or desktop personal computer), and/or other appropriate devices or components capable of executing software. ESA 100 may be implemented using various appropriate architectures or environments, such as an advanced reduced instruction set computing (RISC) machine (ARM or "arm"), an instruction set architecture such as x86, other workstations or development environments, etc. ESA 100 may be executed by, and/or otherwise implemented via, a computing device such as a server for a user such as a system designer at a development or integration laboratory. In some embodiments, ESA 100 may be executed by, and or otherwise implemented via, virtualized hardware and instruction sets. In some embodiments, the ESA 100 may be utilized at compile time if source code is available.

Target binary 110 may be associated with various platforms, operating systems, architectures, components, etc. In some cases, target binary 110 may be an embedded software application associated with a device or component such as an IoT device that is integrated into a macro system or device. Such devices may include features, such as wireless communication, that may allow malicious users to exploit vulnerabilities of the embedded software to utilize the device to attack the system. For example, a system developer may include multiple wireless cameras in a security application, where the cameras are manufactured by a different party and the system developer does not have access to features such as source code. Such devices (e.g., IoT devices) may include integrated command line tools that are thus integrated to the larger development environment. Target binary 110 may be a copy of the actual embedded binary file, generated by a resource such as a dynamic binary instrumentation framework.

As shown, ESA 100 may receive the target binary and any initial input seed(s). The target binary may be received as a data file, stream, or other appropriate ways. In some embodiments, ESA 100 may build the target binary 110 or extract the target binary 110 from the embedded device. In some embodiments, ESA 100 may access the target binary 110 via one or more interfaces of the associated embedded device (e.g., a communication bus, software layers, etc.).

The initial input seeds may be received from various appropriate resources (e.g., a dynamic binary framework may be used to analyze the target binary) and/or may be generated by the ESA 100. The initial input seeds may include and/or be associated with random data. The initial input seeds may be associated with various attributes (e.g., formatting requirements, register sizes, etc.).

ESA 100 may identify potential issues or vulnerabilities by, iteratively, retrieving (at 130) a next input, fuzzing and/or drilling (at 135) the received input, identifying (at 140) test cases based on the fuzzing and drilling, and saving (at 145) any crashing inputs, hanging inputs, otherwise malfunctioning inputs, and/or other inputs of interest to a crashing inputs queue. Fuzzing and drilling will be described in more detail in reference to FIG. 2 below. Returning to FIG. 1, fuzzing may include bombarding the inputs with random or partly randomized data. Drilling may include symbolically tracing inputs to identify diverted states and updating a fuzzing inputs queue to include additional relevant inputs associated with such diverted states and/or other results of the drilling analysis.

Issues or vulnerabilities may be identified by iteratively evaluating each input in the fuzzing inputs queue. In some embodiments, ESA 100 may include an embedded dynamic binary instrumentation (and/or other appropriate features) that may be used to add inputs to the fuzzing inputs queue. The ESA 100 may mutate a current test case until new inputs are found or a certain number of cycles is completed without any new inputs being found. If no new inputs are found for a specified number of cycles (and/or other appropriate evaluation criteria), drilling may be performed by the ESA 100 to discover new test cases and add the new test cases to the fuzzing inputs queue.

ESA 100 may iteratively analyze and identify vulnerabilities by retrieving (at 150) the next input in the crashing inputs queue, identifying (at 155) one or more bug types, and saving (at 160) the results. Such crashing inputs may be analyzed by ESA 100 using a resource such as a dynamic binary instrumentation framework (e.g., DynamoRIO) and various associated vulnerability checkers. Each vulnerability in the crashing inputs queue may be analyzed and the results compiled into bug report 120.

DynamoRIO is a dynamic binary instrumentation framework that may allow clients (e.g., ESA 100 and/or components thereof) to perform code transformation on any binary, inserting and modifying assembly instructions and adding hooks that allow for custom code to be executed while the binary runs. DynamoRIO supports ARM32, ARM64, x86, and x86_64 architectures. ESA 100 may support such architectures, among others. The DynamoRIO framework and API may be utilized to insert redzones in heap and stack memory, manage implementation of memory tracking, and manage generation of function call stacks.

In addition to crashing inputs, some embodiments of the ESA 100 may identify non-crashing issues (e.g., memory access issues that don't cause a crash). In some embodiments, diagnostics may be used to associate crashes (and/or other issues) to a cause or initiator of the crash (e.g., an operation at a first block may cause an issue that results in a crash at a later block).

Bug report 120 may include a listing of vulnerabilities and/or other errors. The listing may include information such as a unique identifier 165, a vulnerability type 170, and/or other appropriate information (e.g., description, file or line number if available, binary address, debug information, etc.). In some embodiments, the bug report 120 may include listings of errors such as those produced by a GNU not Unix (GNU) debugger (GDB).

Some embodiments of ESA 100 may utilize machine learning models to generate inputs and/or otherwise analyze vulnerabilities of the target binary 110. As shown, training such machine learning models may include iteratively generating (at 175) an input, evaluating (at 180) the input, and updating (at 185) the machine learning models.

In some embodiments, a first model may be used to generate (at 175) each input, while a second model may be used to evaluate (at 180) each generated (or otherwise provided) input. Such evaluation may include determining whether the received input was generated by a model or is an actual input (e.g., as received from a set of training data and/or other appropriate resource, such as the dynamic binary instrumentation framework). The models may be trained until the evaluation model is unable to differentiate actual inputs from model generated inputs. The updated models may then be used to improve input generation for the fuzzing and drilling operations.

In some embodiments, fuzzing and drilling may be performed for several hours in order to identify interesting code paths which may be used for smart seeding using a generative adversarial network (GAN) or other machine learning framework. If a code path keeps failing to execute, symbolic execution may be performed relative to the code path (e.g., by identifying an input condition or attribute associated with the code path).

Figure 2:
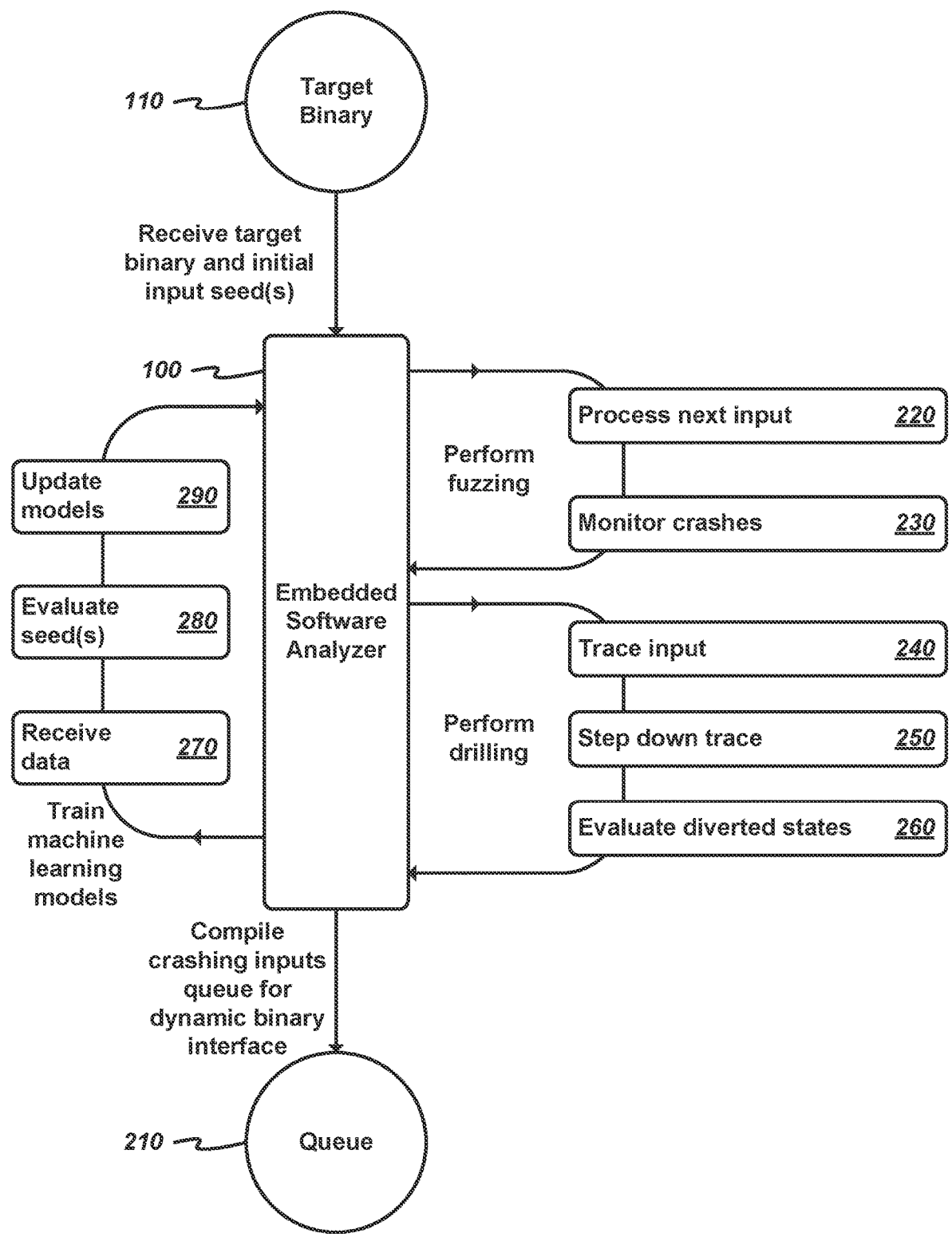
FIG. 2 illustrates an example overview of one or more embodiments described herein, in which fuzzing and drilling are used to analyze a target binary.

FIG. 2 illustrates an example overview of one or more embodiments described herein, in which fuzzing and drilling are used to analyze a target binary 110. As shown, ESA 100 may receive the target binary and initial input seeds and then perform fuzzing and/or drilling. The fuzzing and drilling operations may be performed at least partly in parallel such that inputs are available for fuzzing. Fuzzing and drilling may be performed to generate and/or update crashing inputs queue 210.

As shown, fuzzing may include processing (at 220) the next input in the fuzzing inputs queue and monitoring (at 230) crashes or other issues associated with the next input. Fuzzing may utilize a resource such as American Fuzzy Lop (AFL). The fuzzing inputs queue may be monitored and updated to identify new test cases using the AFL (or other appropriate fuzzing components) and driller.

Monitoring (at 230) crashing inputs may include updating a crashing inputs queue or directory, updating fuzzing statistics and bitmap based on the crashing inputs, updating the fuzzing inputs queue with new test cases, and updating the dynamic binary instrumentation component with inputs to be analyzed by the vulnerability checkers.

Drilling may include tracing (at 240) each input, stepping (at 250) down each trace, and evaluating (at 260) any diverted states. Each input may be traced by exploring the input symbolically using information from the bitmap. While stepping down the trace, ESA 100 may identify diverted states, where the basic block addresses are not in the trace path. Limited symbolic exploration may be performed by the ESA 100 for each diverted state in order to pass complex checks that the fuzzing component is unable to accomplish. Any newly found test cases may be added to the fuzzing inputs queue.

Fuzzing may be performed for each test case in the fuzzing inputs queue. Drilling mat be performed until a trace length exceeds the number of basic blocks.

Some embodiments of ESA 100 may utilize machine learning models to generate input seeds and/or otherwise perform fuzzing and/or drilling. As shown, training such machine learning models may include iteratively receiving (at 270) training data, evaluating (at 280) the input seeds, and updating (at 290) the machine learning models. Training data may include, for instance, previously generated seeds, results associated with those seeds (e.g., identified vulnerabilities such as crashes or hangs), actual inputs, etc.).

Figure 3:
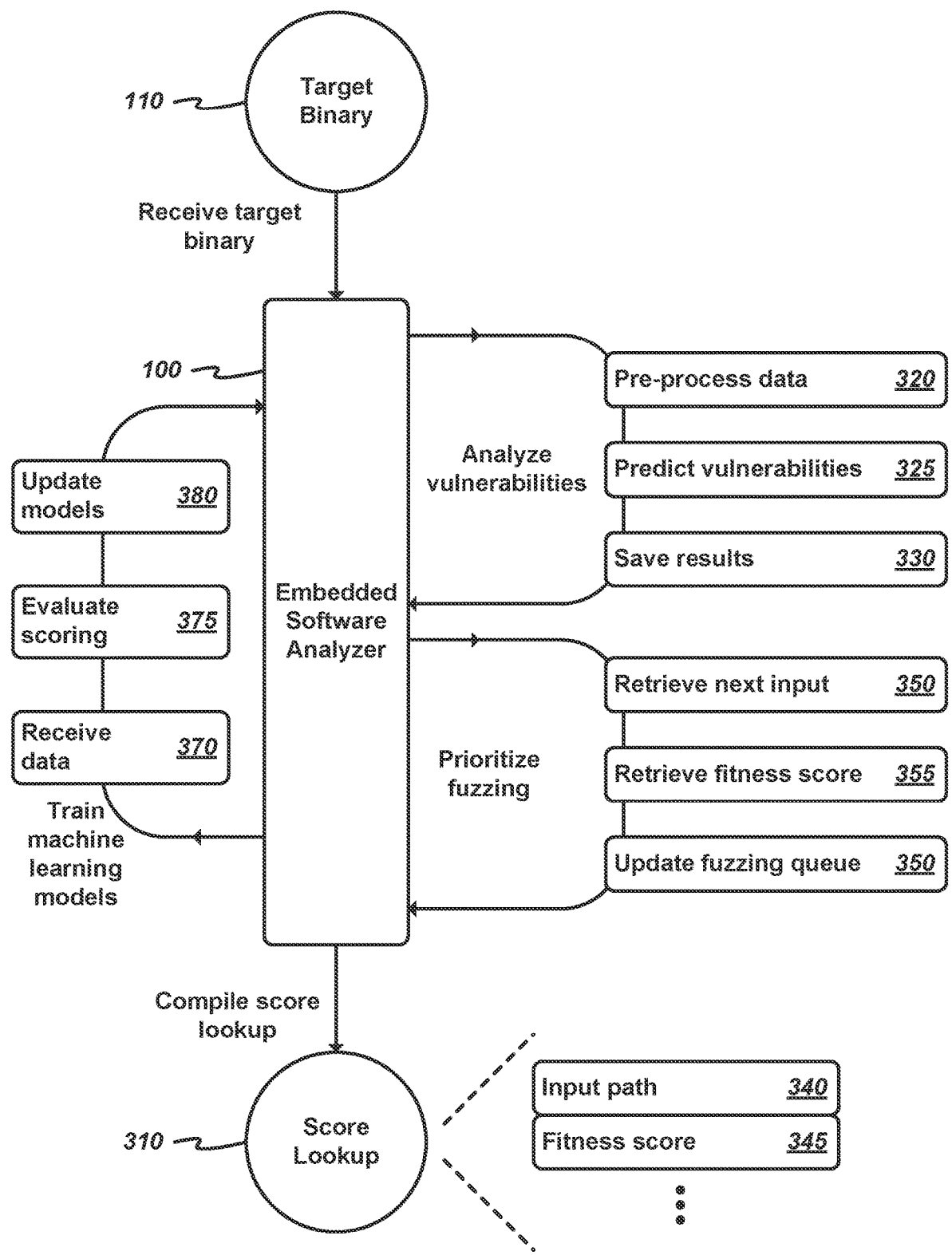
FIG. 3 illustrates an example overview of one or more embodiments described herein, in which vulnerability scores are calculated for prioritizing evaluation paths of a target binary.

FIG. 3 illustrates an example overview of one or more embodiments described herein, in which vulnerability scores are calculated for prioritizing evaluation paths of a target binary 110. Vulnerability scores may be stored in score lookup 310, which may be available to the fuzzing component for use in prioritizing paths during the fuzzing and/or drilling processes.

As shown, ESA 110 may receive the target binary 110 and analyze vulnerabilities by pre-processing (at 320) the target binary data, predicting (at 325) vulnerabilities, and saving (at 0330) the results.

Pre-processing (at 320) the target binary data may include, for example, identifying basic building blocks of the target binary 110, execution paths, etc. Such pre-processing may be performed by or using a resource such as a dynamic binary instrumentation framework.

Predicting (at 325) vulnerabilities may include calculating a vulnerability score for each block (e.g., a number from zero to one indicating a probability of detecting a vulnerability in the associated block) using a machine learning model.

The results may be saved (at 330) to a score lookup 310 (e.g., a file or data structure) that includes a listing of input paths 340, associated fitness scores 345, and/or other appropriate information. Such fitness scores 345 may be calculated, for example, by summing or averaging the vulnerability scores for blocks associated with the input path 340.

During fuzzing and/or drilling, the ESA 100 may prioritize fuzzing based on the fitness scores 345 by retrieving (at 350) a next input from the fuzzing inputs queue, retrieving (at 355) the fitness score associated with the input oath retrieved at 350, and updating (at 350) the fuzzing input queue based on the fitness score. For instance, all inputs in the fuzzing input queue may be sorted by fitness score such that analysis of input paths more likely to have vulnerabilities is prioritized over analysis of inputs path less likely to have vulnerabilities.

Some embodiments may use machine learning models to predict vulnerabilities (e.g., by generating a vulnerability score for each block). The machine learning models may include neural-network based models developed using resources such as PyTorch. Such models may be trained using test suite data (e.g., Juliet 1.3 dataset). As shown, such training may include receiving (at 370) the training data, evaluating (at 375) scoring based on the training data, and updating (at 380) the models based on the evaluation.

Figure 4:
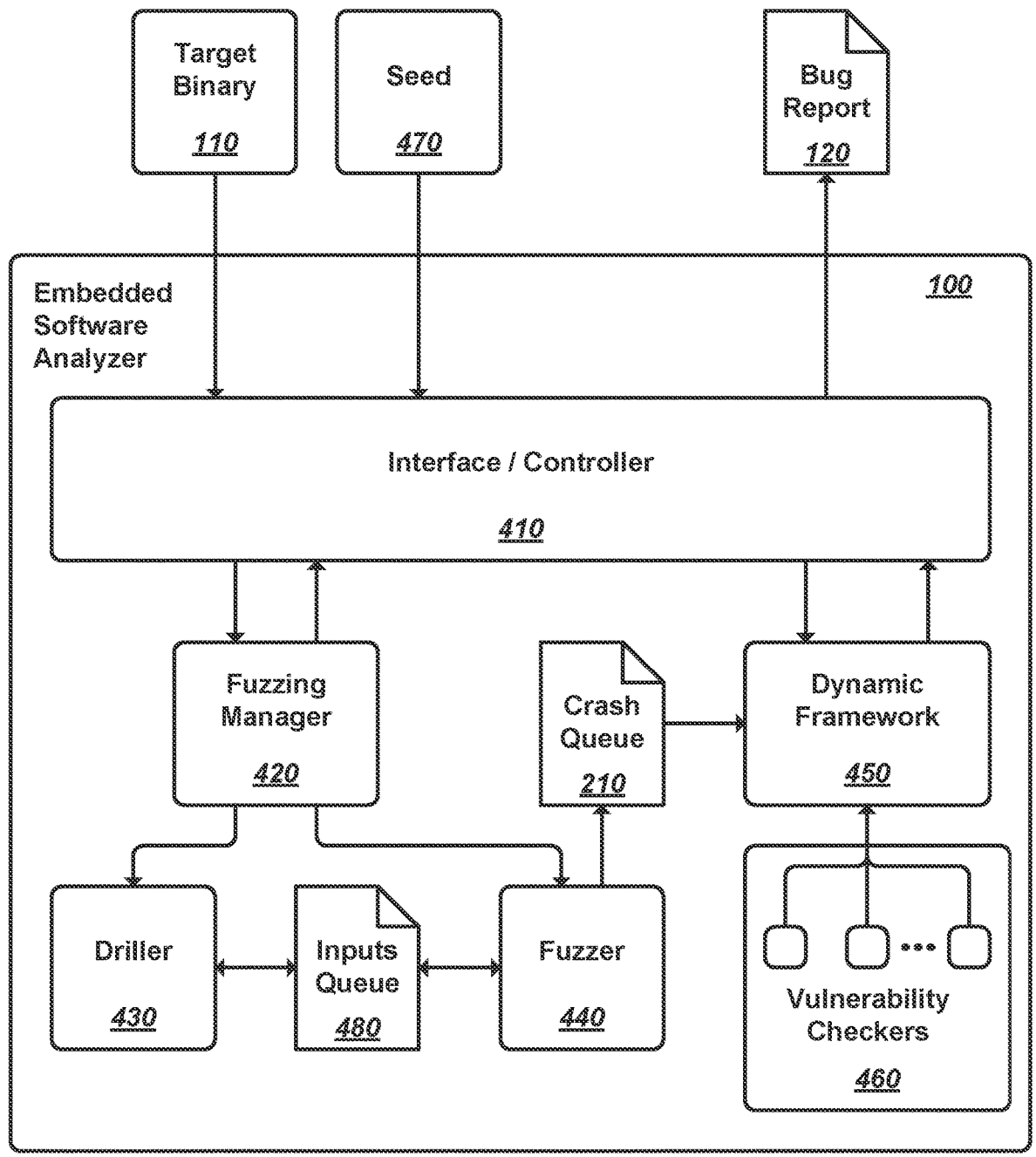
FIG. 4 illustrates a schematic block diagram of one or more embodiments described herein, in which an embedded software analyzer (ESA) generates a bug report for a target binary.

FIG. 4 illustrates a schematic block diagram of one or more embodiments described herein, in which an ESA 100 generates a bug report 120 for a target binary 110. As shown, ESA 0100 may include an interface and/or controller 410, fuzzing manager 420, driller 430, fuzzer 440, dynamic framework 450, and associated vulnerability checkers 460. ESA 100 may utilize data resources such as seed 470, inputs queue 480, and/or crash queue 210.

Interface and/or controller 410 may include a wrapper and/or various other elements that are able to interact with a development or test environment. Fuzzing manager 420 may control the operations of driller 430 and fuzzer 440. Driller 430 may utilize an embedded or external dynamic binary instrumentation framework to identify additional inputs to add to the fuzzing inputs queue 480.

Fuzzer 440 may include or utilize an AFL fuzzing application. Fuzzer 440 may include an embedded dynamic binary instrumentation framework (not shown). Fuzzer 440 may generate and/or update fuzzing inputs queue 480. The fuzzing inputs queue 480 may be prioritized based on vulnerability scores and/or other relevant criteria.

Fuzzer 440 may generate and/or update crashing inputs queue 210, which may be analyzed by dynamic framework 450 (and/or other appropriate resources) to calculate vulnerability and/or fitness scores and utilize those scores to prioritize analysis of the inputs in the crashing inputs queue 210.

Dynamic framework 450 may include and/or utilize a dynamic binary instrumentation framework such as DynamoRIO. Dynamic framework 450 may redirect execution of the target binary 110 to a copy. Instrumentation that carries out the actions of the software tool(s) associated with the target binary 110 are added to the copy. Dynamic framework 450 may monitor program control flow to capture the entire execution of the target code.

Each of the vulnerability checkers 460 may be associated with one or more known vulnerability types and may be utilized by the dynamic framework 450 to identify and/or otherwise evaluate vulnerabilities.

Seed 470 may be received from a resource associated with the target binary 110 and/or may be generated by ESA 100. Seed 470 may be generated utilizing a resource such as dynamic framework 450. Some embodiments of the ESA 100 may include a smart seed generation module (not shown) that may be able to generate or identify initial seeds 470 and/or inputs for the fuzzing inputs queue.

Such smart seeding may include, for instance, bootstrapping the fuzzing and/or drilling processes by limiting inputs to those that satisfy some criteria. For example, an application associated with image processing may fail if non-image data is provided. For example, an invalid format error may be generated. Thus, the smart seed module of some embodiments may determine the attributes of an image file (e.g., ".jpg" or ".png" formatting requirements) and apply filtering to the generated inputs such that only valid file types are provided for analysis. Such smart seeding may be performed using machine learning models.

Figure 5:
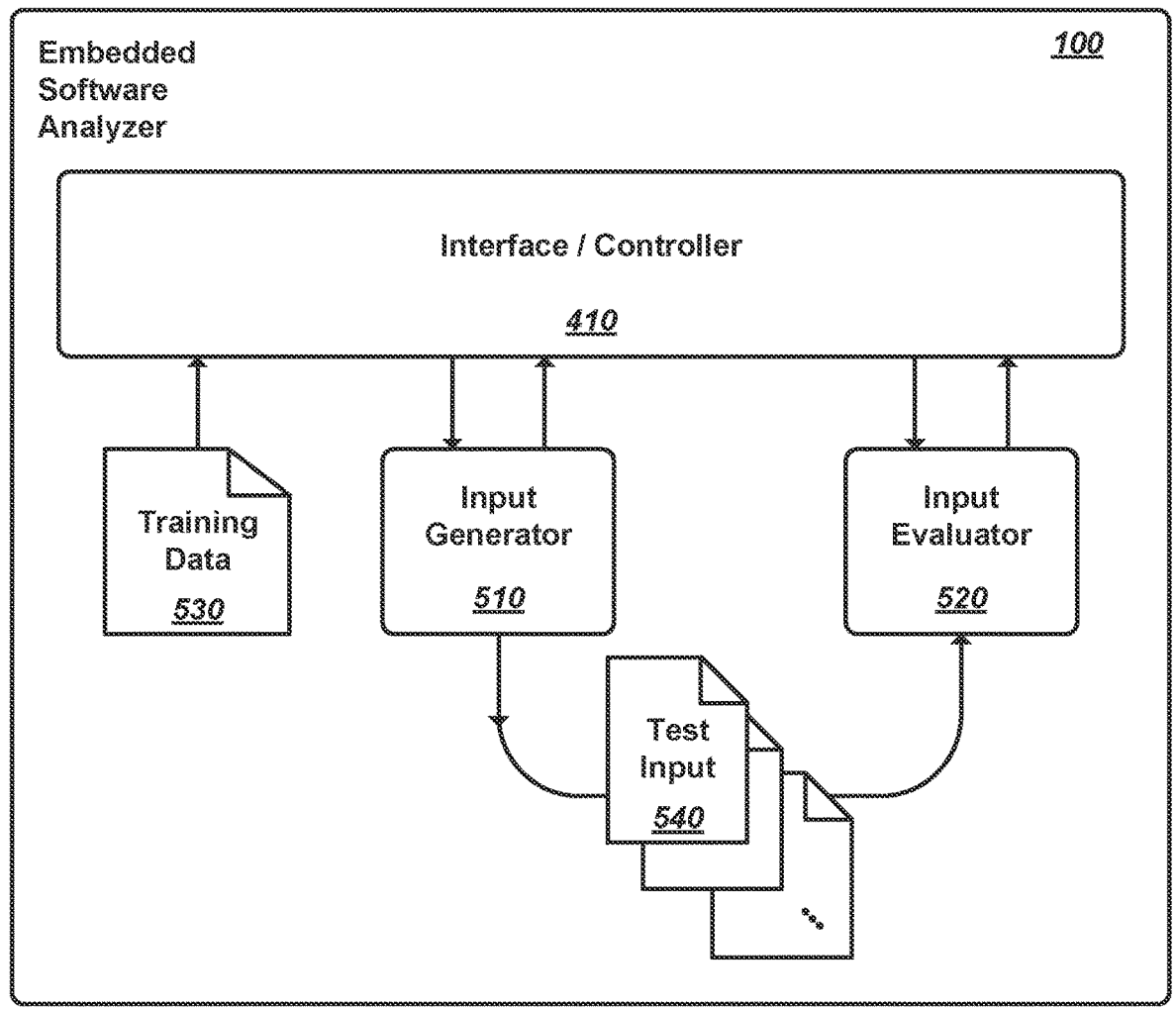
FIG. 5 illustrates a schematic block diagram of one or more embodiments described herein, in which an embedded software analyzer (ESA) implements machine learning to improve the performance of modeled inputs.

FIG. 5 illustrates a schematic block diagram of one or more embodiments described herein, in which ESA 100 implements machine learning to improve the performance of modeled inputs. Such machine learning may be associated with the training described above in reference to operations 175-185. As shown, ESA 100 may include an input generator 510 and an input evaluator 520. ESA 100 may have access to training data 530 and be able to store test inputs 540 in a file or other data structure.

Input generator 510 and input evaluator 520 may be machine learning models such as, for example, neural networks. Input generator 510 may generate a test input 540, and/or provide an actual input from training data 530 to input evaluator 520 which will, in turn, indicate whether the received input was an actual input or modeled input. Interface/controller 410 may monitor the operations of the input generator 510 and the input evaluator 520 to determine whether the input evaluator 520 correctly indicated the input type. Feedback regarding the correctness of such determinations may be provided via training data 530 and/or other resources.

Training may be performed until the input evaluator 520 is unable to accurately distinguish between generated and modeled test inputs 540. Such determination may be made based on an accuracy or fit threshold associated with the training and/or evaluation data.

Figure 6:
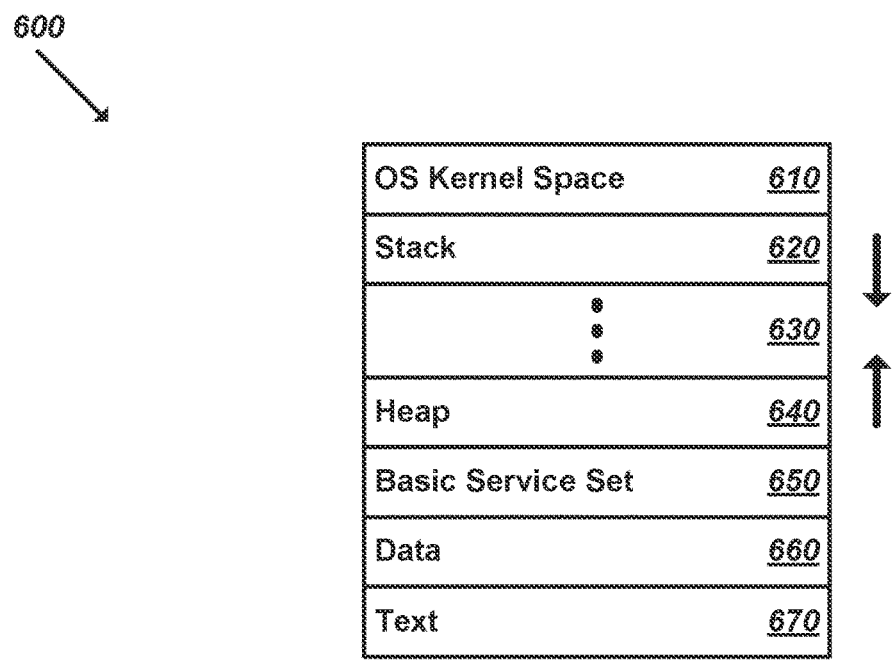
FIG. 6 illustrates a schematic block diagram of an example memory layout associated with some embedded systems.

FIG. 6 illustrates a schematic block diagram of an example memory layout 600 associated with some embedded systems. In this example, the memory layout includes operating system (OS) kernel space 610, a stack 620, unused or available memory 630, a heap 640, basic service set 650, data 660, and text 670.

As shown, the heap 640 may grow from lower memory addresses to higher memory addresses, while the stack 620 may grow from higher memory addresses to lower memory addresses as data is added. Memory regions may be allocated on the heap 640 at runtime.

Memory vulnerabilities may occur when software can be forced to access memory it should not be allowed to access. For instance, code that writes data past the defined bounds of a local stack variable may overwrite the return address, causing execution to jump to an undefined location. Several example memory vulnerabilities are described below.

A dangling pointer vulnerability, or use-after-free, occurs when a program attempts to read or write data from a pointer that has been freed. Such a vulnerability may cause data to be written to a memory region no longer controlled by the program, thus causing undefined behavior.

A double free vulnerability is triggered when a program tries to free a pointer that has already been freed.

A heap overflow vulnerability is caused by lack of bounds checking on dynamically allocated memory. For example, if an array buffer is generated with a size of one hundred characters and a string containing more than one hundred characters is copied to the array. Such a vulnerability may allow an attacker to write to memory on the heap past where the contents of such an array buffer.

A stack overflow vulnerability is caused by improper bounds checking when copying data to an array. Stack overflow vulnerabilities may occur when copying data to a locally defined array in a function. For instance, if a string containing eight or more characters is copied to a locally defined array having a size of eight characters, data will be written past the variable and may corrupt other information stored on the stack.

One popular technique for detecting memory vulnerabilities is to is to mark certain areas as redzones, or regions that software that is operating correctly should never write to and/or otherwise access. These areas can either be preexisting memory regions which the application should not write to (e.g., code loaded into memory), or extra regions purposefully inserted which the software should not know about and try and use.

For example, in order to prevent stack overflow exploits, modern compilers may insert a random canary value between the return pointer stored on the stack and the region created for the local function variables. If the random canary value is overwritten at run-time, such override is detected and the execution is stopped.

Similarly, a compile time instrumentation tool may insert redzones around dynamically allocated memory on the heap in order to detect heap overflows. Additionally, memory that has been freed may be marked as such, with any further access flagged as a dangling pointer vulnerability until it is reallocated.

Figure 7:
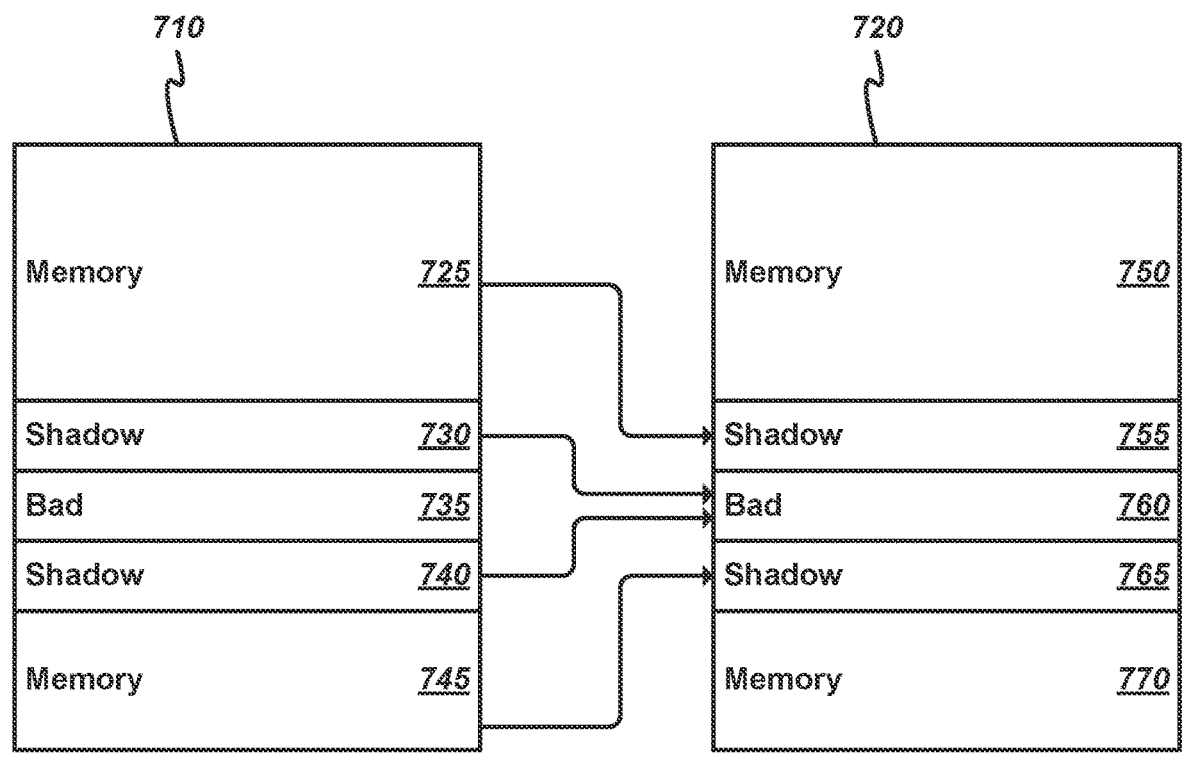
FIG. 7 illustrates a schematic block diagram of an example memory mapping used by some embodiments to analyze a target binary.

FIG. 7 illustrates a schematic block diagram of an example memory mapping used by some embodiments to analyze a target binary. In this example, the original memory allocation 710 is mapped to updated memory allocation 720.

As shown, memory allocation 710 includes memory 725, shadow memory 730, bad memory 735, shadow memory 740, and memory 745. Memory allocation 720 similarly includes memory 750, shadow memory 755, bad memory 760, shadow memory 765, and memory 770.

In this example, portions of memory 725 and 745 are mapped to shadow memory 755 and 765, respectively. Similarly, portions of shadow memory 730 and 740 are mapped to bad memory 760.

Shadow memory mapping techniques may, for every eight-bytes stored in the application memory space (e.g., memory 725 and memory 745), store a one-byte status value in the associated shadow memory (e.g., shadow memory 755 or shadow memory 765, respectively). The two key parts of using shadow memory to track application memory is first how we map application memory address to shadow memory addresses, and second how do we effectively use the eight bits of the status value to track all potential states the corresponding eight-bytes of application memory. Because one eighth of the available memory is needed for shadow memory, and to ensure the shadow memory regions always map to a valid address, the shadow memory address for an application memory address is calculated as (addr>>3)+offset, where offset is dependent on the architecture (e.g., 0x20000000 for x86 or ARM32, 0x7FFF8000 for x86_64, and 0x40000000000000 for Aarch64). Note that for ARM64 architectures, the maximum virtual address can be two different values depending on how the underlying kernel was configured. Fortunately, the maximum virtual address may be programmatically computed at run-time instead of hardcoding the value for ARM64 builds.

Once an offset and maximum address have been defined, the start and end addresses for the various memory regions may be calculated (e.g., the low and high application memory 770 and 750, the low and high shadow memory 765 and 755, and a gap of invalid addresses 765. Example address calculations are shown in Table 1 below.

TABLE 1

| Memory | Address Start | Address End |
|---|---|---|
| High Application 750 | Shadow(MAX) + 1 | MAX |
| High Shadow 755 | Shadow(Shadow(MAX) + 1) | Shadow(MAX) |
| Invalid Gap 760 | Shadow(OFFSET − 1) + 1 | Shadow(Shadow (MAX) + 1) − 1 |
| Low Shadow 765 | OFFSET | Shadow(OFFSET − 1) |
| Low Application 770 | 0x0 | OFFSET − 1 |

A shadow address may be quickly and easily calculated based on an application address, as shown in Table 1. In addition, a one-byte status value corresponding to the eight-byte memory must be determined. The first three bits of the one-byte status may represent the k bytes of application memory that are being references (with k=0 indicating all eight bytes are referenced). The next four bits may be flag bits, indicating whether or not the application memory is read-only, belongs to a heap or stack redzone, or belongs to a region that has been freed. The seventh bit may indicate whether or not the k bytes being referenced are the least or most significant bytes. In sixty-four-bit architectures this is generally never used, as memory is eight-byte aligned. Thirty-two-bit architectures may be four-byte aligned, so there are situations where the most significant four-bytes are being referenced, for instance.

On Linux systems, all dynamic memory allocation done on the heap is performed through the libc API (e.g., malloc, calloc, free). Therefore, in order to track heap memory management, all relevant memory allocation functions must be intercepted. With the ability to intercept all relevant calls, the sizes allocated to ensure redzones may be modified and placed before and/or after allocated memory.

DynamoRIO may allow drwrap_wrap to be used to specify a PRE_FUNC and POST_FUNC callback method to be called at the beginning and end of a specific function. As soon as the specific function is called, DynamoRIO makes a callback into the PRE_FUNC specified by the client, passing a reference to the function arguments. Such an approach not only allows the client to examine the arguments, but to modify the arguments at runtime as well. Similarly, after the function has completed execution a POST_FUNC callback is made, again passing a reference to the return value, allowing for the client to read or change what the wrapped function returns at runtime.

The first step in inserting redzones into allocating memory is intercepting all malloc type functions. In the PRE_FUNC, with the ability to modify the parameters, the bytes argument value can be increased to include the redzones. Then in the POST_FUNC, after the memory has been allocated, the corresponding shadow addresses for the redzones may be marked as inaccessible, and the return pointer may be adjusted to account for the redzone placed before the allocated memory:

Finally, for the free function, a PRE_FUNC may be placed before the intercepted function, which is responsible for three things. First, because the address passed by the application will not correspond to the actual start address that was allocated (and thus cause the function to error out) the pointer value must be adjusted. Second, the address may be checked to determine whether the address points to a value that has already been freed, and thus would be a double free memory vulnerability. Finally, shadow memory corresponding to the allocated application memory may be marked as FREED such that any dangling pointer vulnerabilities may be detected.

The sizes allocated to the memory regions may be written to the redzones if it is large enough, since that is never used by the application. Otherwise, an internal global mapping of allocated addresses and their corresponding sizes in the malloc functions may be maintained. With these function interceptions and modifications, redzones may be inserted around all dynamically allocated memory on the heap, along with track and mark memory that has been freed, and even detect double free memory vulnerabilities when they occur.

Tracking memory allocated on the stack is more difficult since there is no explicit function API responsible for managing and allocating objects. Instead, the stack is managed implicitly as function calls are made, with registers pushed and popped as needed and the stack pointer adjusted to provide memory for local variables. One approach to tracking stack memory allocations and inserting redzones involves adjusting the stack pointer to provide space for local variables by an extra amount to provide room for an explicit redzone. This approach was implemented and tested, and while the approach worked will in most cases, there were some situations that caused errors. While most of the time local variables on the stack are referenced from the bottom of the stack, meaning the addition of the redzone would not change anything, we occasionally saw code that referenced from the top of the stack. This could be remedied by scanning the code and modifying the offset to account for the redzone, however there were still some edge cases where the presence of the extra redzone caused indexing issues.

A second approach was motivated by how stack overflows are commonly exploited. Usually, the goal of these exploits is to overwrite the return pointer that has been pushed onto the stack, causing execution to divert to code of the attackers choosing. In fact, in an attempt to prevent these attacks, compilers use stack guards or random canary values placed before the return address. When a function returns, if the canary has been modified an error is thrown and execution stopped. Thus, instead of directly inserting redzones on the stack, the return pointer pushed onto the stack may be marked as being a redzone and inaccessible, since it should never be legitimately overwritten by the application. For this approach, instructions that push and pop the program counter right before function call and returns may be identified, and callback functions that are responsible for marking the shadow memory corresponding to where the program counter is stored as inaccessible may be inserted.

While generally memory on the stack is only statically allocated, with fixed sizes determined at compile time, libc does support dynamic stack allocation operations at run-time via the alloca function. The functions operates just like malloc, but instead of allocating memory on the heap, it is allocated on the stack. The main issue with handling these cases in dynamic binary instrumentation is that, unlike malloc, alloca instruction are not actually compiled as function calls, instead directly in-lining the assembly instructions in place of the function call. Instead, the instructions may be iterated over as they are loaded, and pattern matching may be performed to detect instructions that correspond to alloca function calls. To do so, the following two sequential instructions: "sub IMM %sp" and "mov %sp->REG" may be searched.

If an alloca instruction sequence is detected, in order to allocate and the memory region with redzones, malloc may be called instead and the memory allocated on the heap. The bytes will be allocated on the heap, with the proper redzones in place so that any overflow that might occur may be detected.

With the client keeping track of all allocated, freed, and redzone memory regions, memory accesses may be detected to look for writes into redzone regions indicating heap overflows, and writes into freed regions indicating dangling pointer vulnerabilities. For this, the client may first use the drmgr_register_bb_instrumentation_event to register a callback method so the client can examine every single instruction executed by the program. This callback function is responsible for checking for any memory references made during an execution, and for each memory reference made to insert code that can, at run time, compute and check the address of the memory reference being made.

In order to instrument memory references, the address may be fetched and a callback inserted. The drutil_insert_get_mem_addr adds instructions that will, at run time, calculate the address of the memory reference and copy the value into a reserved register. The dr_insert_clean_call adds a callback to the process_memref function, which performs the vulnerability checks. The function loops over the address being accessed, incrementing it by eight—the number of bytes referenced by shadow memory—each time. First, if the shadow value of the address is zero, the access is valid, and the rest of the memory accesses may be evaluated. For non-zero values, all the flag values set along with the number of bytes accessed may be extracted. If the bytes accessible is zero, that means the entire eight bytes is referenced and a flag was set, so some invalid access was made. Otherwise, the number of bytes being accessed may be checked versus the number of accessible bytes, and, based on the most significant flag, if the boundary was crossed then an invalid access occurred.

Finally, if an invalid access was indeed made, based on the flags set and if the memory access was a write, a vulnerability may be flagged. For now, only flag writes to redzones may be detected as invalid, because, due to optimizations in libraries and compilers reads may often cross bounds, with the values read simply discarded.

The issue with inserting clean calls for every memory reference is that it adds a large amount of run-time overhead when instrumenting the application. Context switches between the application and the DynamoRIO client are expensive and can add an order of magnitude more to the run-time. To remedy this, DynamoRIO supports directly inserting assembly code into the application that will be executed as it runs, dropping the need for context switching. For this, we take advantage of the fact that calculating the shadow address is an incredibly simple operation, and the fact that the vast majority of memory accesses will have a corresponding shadow value of zero. Thus, the vast majority of these cases may be skipped or ignored, and the process_memref function may be called only for memory access with non-zero shadow values. To implement this, before each memory access, the drutil_insert_get_mem_addr function may be used to copy the address into a reserved register, and then the following assembly code may inserted to calculate the shadow address and check the value:

for x86/ARM32:
mov addr->reg1; reg1=addr
slr reg1, 3; reg1=reg1<<3
add reg1, OFFSET; reg1=reg1+OFFSET
load reg1, reg1[0]; reg1=*reg1
cmp reg1, 0; if reg2!=0
jne process_memref; process_memref( )

for Aarch64:
mov addr->reg1; reg1=addr
slr reg1, 3; reg1=reg1<<3
movk reg2, 16, 32 ; reg1=16<<32=1<<36
add reg1, reg2; reg1=reg1+reg2=reg1+OFFSET
load reg1, reg1[0]; reg1=*reg1
cmp reg1, 0; if reg2!=0
jne process_memref; process_memref( ).

Note for 64-bit ARM architectures (Aarch64) we need slightly different assembly as shown above. This is due to the fact that the OFFSET used to calculate the shadow address—1<<36—is too large to store in an immediate value and use. Instead, a second reserved register may be used with the movk instruction, which moves an immediate value and shifts the value to the left up to thirty-two places, allowing us to load the value 16<<32 or 1<<36 into a register. In either case, about ten extra assembly instructions must be executed for each memory access to determine if the corresponding shadow memory value is zero or not, which in the large majority of cases it will be. This allows for much more efficient memory tracking and vulnerability checking than requiring context switches for each and every memory access.

All function calls and returns may be detected and tracked. This serves two major purposes for vulnerability detection. First, because stacks are allocated and destroyed during function calls and returns, we need the ability to detect when they occur to perform the necessary shadow memory bookkeeping. Additionally, any time a vulnerability is detected the client can print out the series of function calls made and, if debugging information is included in the binary, the filename and line number where the vulnerability occurred.

While maintaining a call stack for programs executing on the x86 architecture is trivial, doing so on ARM becomes slightly more complicated. While the x86 instruction set includes explicit call and return instructions, in ARM function calls and returns are done by performing branches and by writing to the program counter (PC) register. While technically this could make it difficult to separate legitimate functions calls from other valid instructions performing branches or program counter writes, how function calls are performed in reality makes allows calls and returns to be identified based on the exact instructions and registers involved.

DynamoRIO includes function calls that can be used to determine if an instruction is a direct or indirect function call, with Application Programming Interface (API) calls instr_is_call_direct and instr_is_call_indirect. For ARM, these API calls simply check if the operation being performed is either a BL or BLX. These operations can be performed either by directly branching to a program counter address, or to an address stored in a register. DynamoRIO also has an instr_is_return API for ARM, which considers an instruction a return if the operation is an indirect branch through the LR register, if the instruction reads from the LR register and writes to the program counter PC, or if the instruction pops a value into the program counter PC.

However, the instr_is_return API call cannot distinguish between a function return instruction and instructions in the procedure lookup table (PLT) section used for jumping to functions call in external libraries. The code in the PLT section may be uniform and easy to identify. Simply by checking that the instruction does not match "ldr pc, XXX", where XXX is not the stack pointer (SP), we can avoid falsely labeling these instructions as function returns.

An additional complication involves handling detection of call and return instructions in ARM. Branch instructions used for both function call and return instructions can be conditional based on flags set by previous instructions which determine, at run time, whether or not the function will be called. To handle these cases, the predicate type returned by instr_get_predicate may be passed to the call and return callback functions, so at run time we can check to see if the instruction will actually be executed based on the predicate type and flags set. With the ability to detect function calls and returns, we can insert callback functions that push the address where the call was made onto a callstack, and pop it off when returns are made. Then, whenever we detect a vulnerability, we can simply print out the addresses from the callstack.

Figure 8:
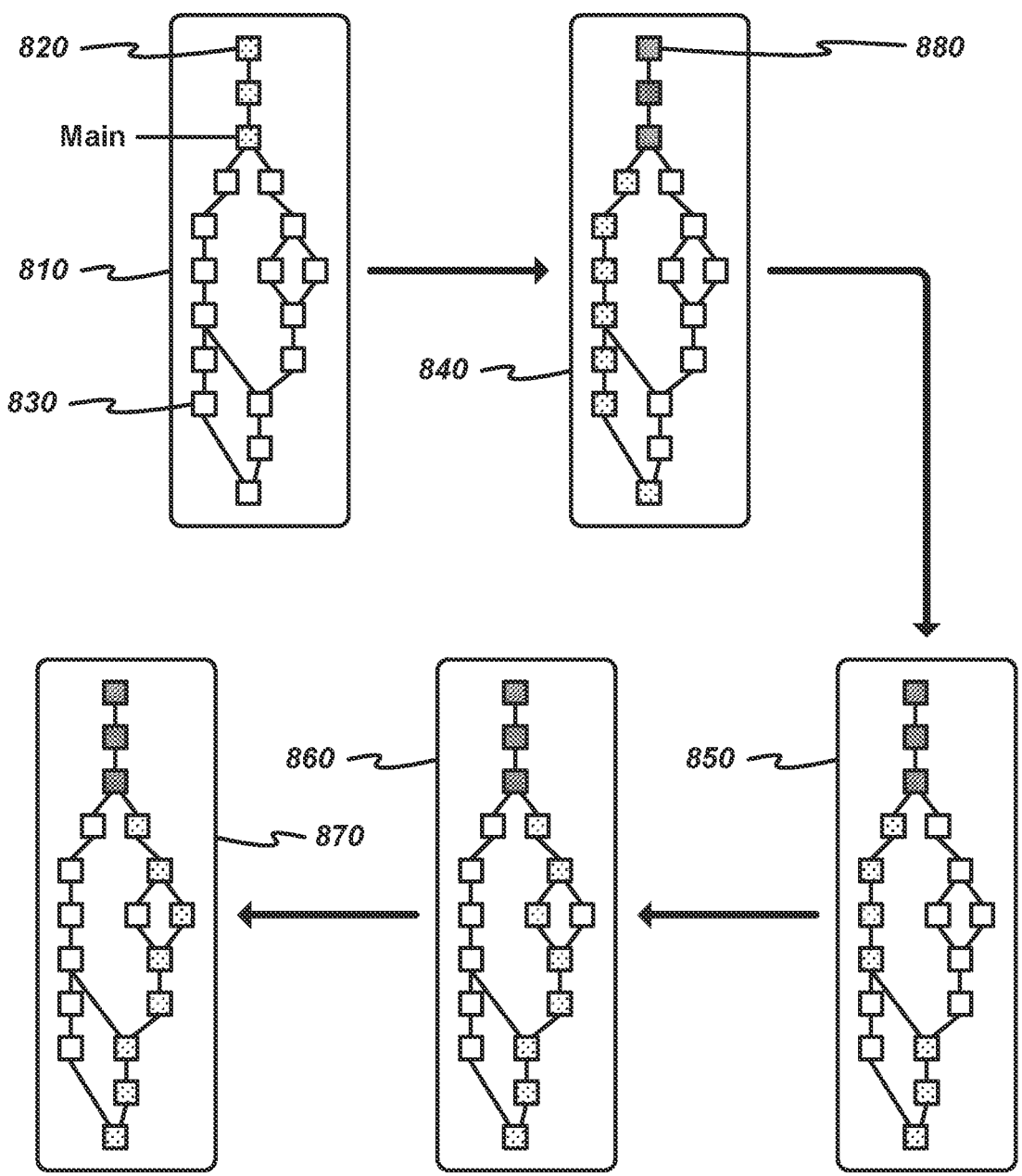
FIG. 8 illustrates a persistent mode analysis process flow using a fork server.

FIG. 8 illustrates a persistent mode analysis process flow using a fork server. One of the main sources of run-time overhead for DynamoRIO is loading and analyzing the application, along with performing all the instrumentation of inserting assembly and callback functions into the execution paths. Since fuzzing requires repeatedly executing the same application on different inputs, it would be ideal if we only have to perform the analysis and instrumentation once and not have to redo it over and over again for each run. For this we considered two approaches, implementing a fork server similar to the one used by AFL, and instrumentation that adds an infinite loop around the main function body.

Before either of these could be implemented, we first needed a method for getting the address of the main function, since that is where we either want to fork off copies, or insert the infinite loop. When the application is built with debugging symbols, this is trivial since for each module that is loaded, we can use the drsym_lookup_symbol method to search for the "main" symbol and the corresponding address. However, this method does not work when debugging symbols are not included, which is fairly standard in third-party applications and binaries. Instead, we can use the same function to look for "_libc_start_main", which is always included. This function is responsible for calling the main function, and actually has the main function address of the first parameter.

Once we have the address of _libc_start_main, we can then check when we are making a function call to the address, and insert a callback function that then extracts the main function address from the first function parameter. After we have the main function address, we can the same thing and insert a callback function that is triggered when main is called. In this callback we can implement the fork server and the infinite loop instrumentation.

For the fork server, the very first time we run the main function we enter into a loop where we fork off a child process, and in the parent wait until the child completes execution. This ensures that DynamoRIO with the application stays loaded and we can quickly start execution back up from main repeatedly. The one downside to the fork server method is that any code or basic blocks that are instrumented after the fork will not be retained in the forked copies, meaning they will have to be re-instrumented, as shown.

In this example, the parent 810 includes newly visited basic blocks 820 and unvisited basic blocks 830. Each child 840-870 may include newly visited blocks 820, unvisited blocks 830, and previously-visited blocks 880.

Figure 9:
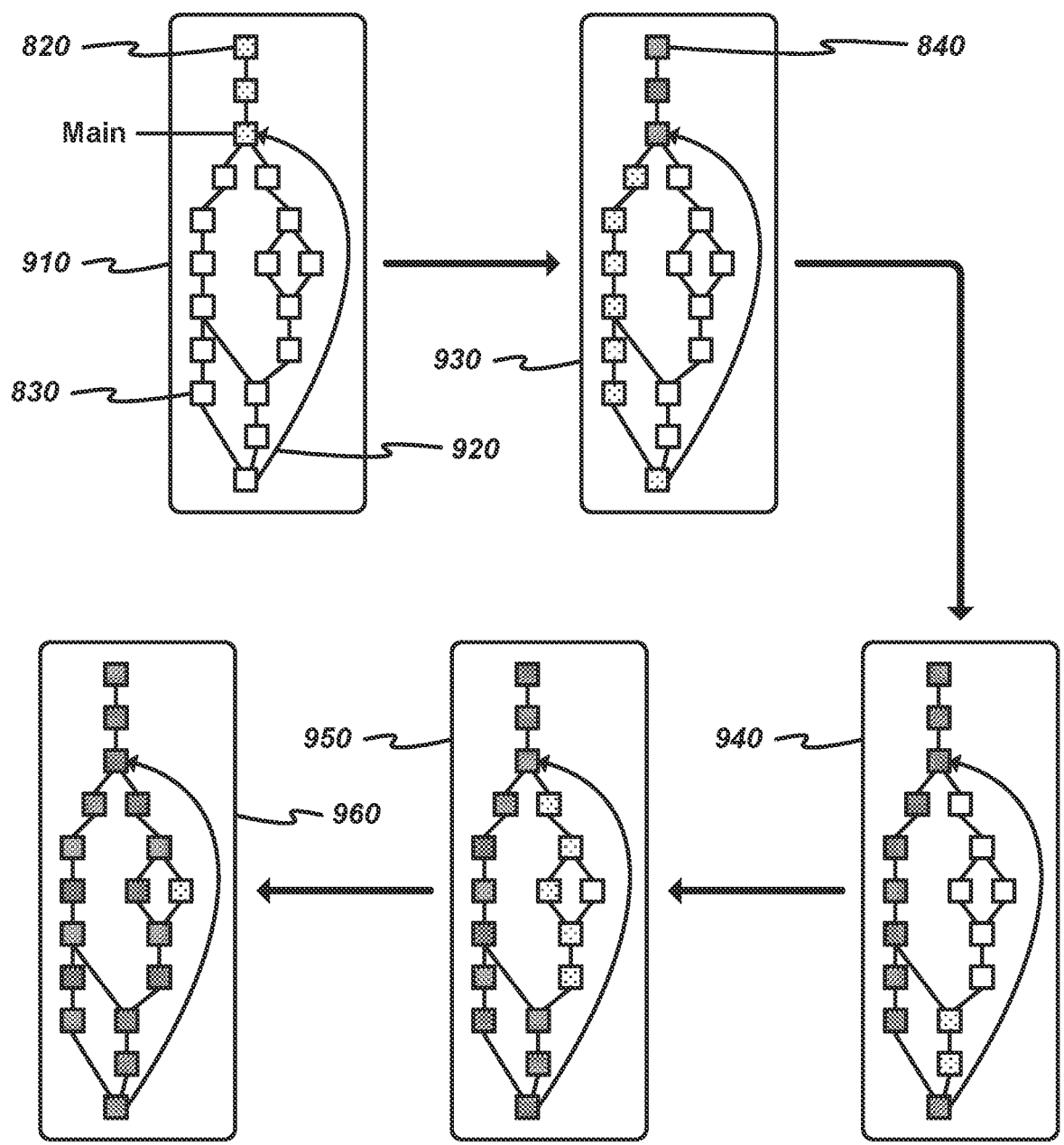
FIG. 9 illustrates a persistent mode analysis process flow using an infinite loop.

FIG. 9 illustrates a persistent mode analysis process flow using an infinite loop. For the main infinite loop method, there are two major instrumentation tasks that need to be performed. First, for every return instruction included in the main body, a jump or branch instruction is inserted back to the main function address we retrieved earlier. Second, at the beginning of the main function, all the register values need to be saved to an array stored locally in the DynamoRIO client, so that before we jump back to the beginning of main, all those register values can be restored to ensure proper execution. With these, the application will never return from main, repeatedly executing the main function body. The advantage to this approach, as compared to the fork server technique, is that as more code paths are executed, those basic blocks will remain instrumented, significantly reducing run-time overhead, as shown.

While these approaches may allow for efficient repeated executions, as is they will simply execute the same code paths on the same input repeatedly. In order to allow for the fuzzer to control execution on different inputs, we setup an Inter-Process Communication (IPC) feature that allows a runner script to be notified before each run, allowing the script to setup a new input and then continue execution in DynamoRIO. Since fuzzing is almost entirely done through file operations, we assume one of the inputs for the application is a file. The runner script can then create links from the actual input to the same filename, allowing for different executions on the same command line arguments containing a filename. For the IPC between the runner script and DynamoRIO, while there are a lot of potential ways this can be performed, support for scenarios where the runner script and DynamoRIO are running on different host machines and communication must be done over Secure Shell (SSH) is important. Therefore, name pipes were used, a parent and child pipe. The parent pipe is for DynamoRIO writing data to the runner script, and the child pipe is for the runner script writing data to DynamoRIO.

In this example, the parent 910 includes an inserted branch 920 and each child 930-960 shows the progression of block evaluation.

Figure 10:
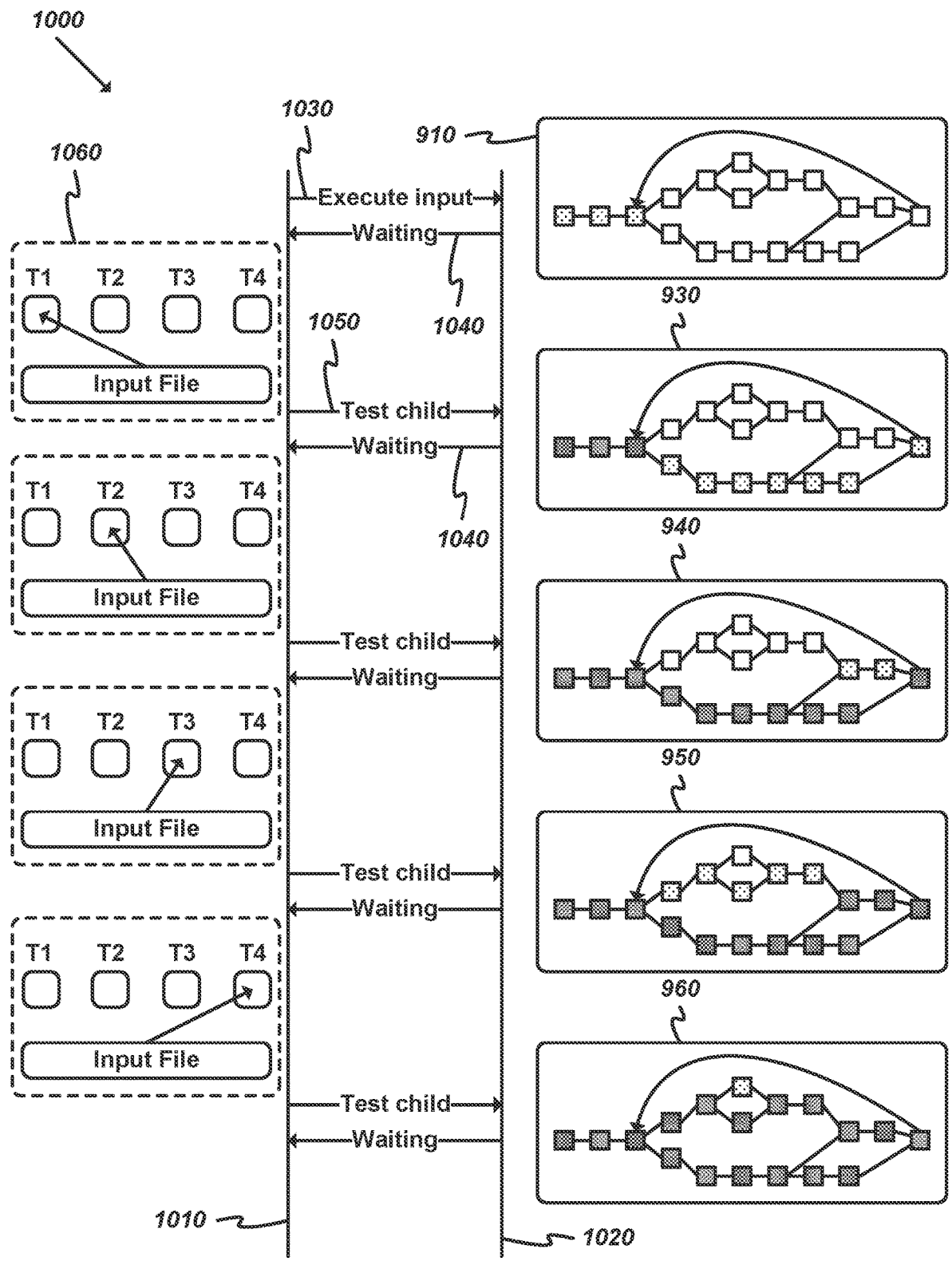
FIG. 10 illustrates a data flow diagram used for persistent mode analysis.

FIG. 10 illustrates a data flow diagram 1000 used for persistent mode analysis. The basic flow is that DynamoRIO notifies the runner script when it is waiting in main, at which point the runner setups the testcase files as needed, then writes back to DynamoRIO that it can start running the testcase. In this example, runner 1010 and DynamoRIO 1020 may communicate as shown, by exchanging sets of messages including execute input 1030 and waiting 1040 or test child 1050 and waiting 1040.

Test case indicator 1060 indicates the current test case being executed by the parent pipe 910 and child pipes 930-960.

Figure 11:
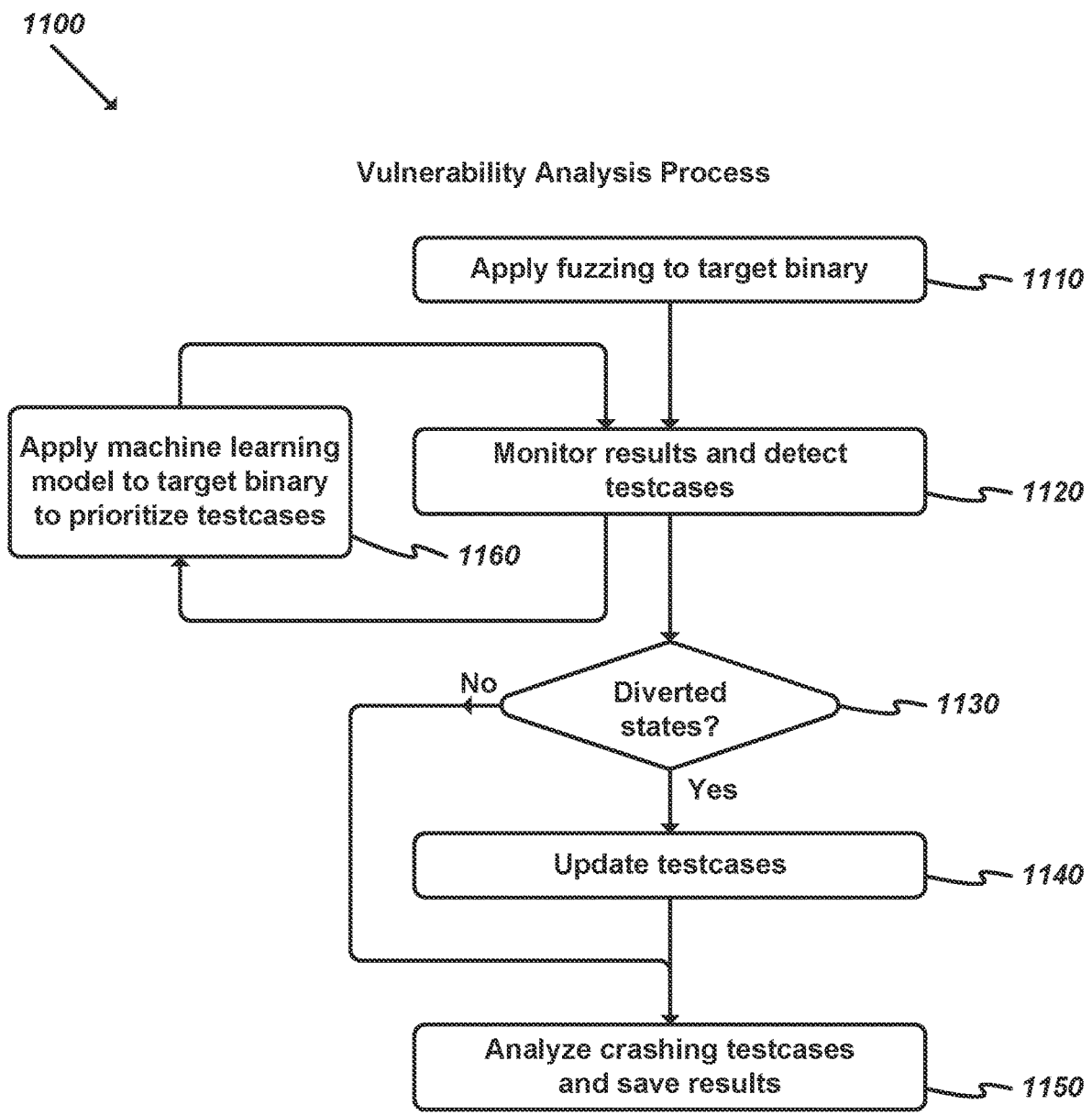
FIG. 11 illustrates a flow chart of an exemplary process that detects vulnerabilities of an embedded element.

FIG. 11 illustrates an example process 1100 for identifying vulnerabilities in embedded components. Such a process may be associated with the overview of FIG. 1. Returning to FIG. 11, process 1100 may be performed when a target binary is received and/or under other appropriate conditions. In some embodiments, process 1100 may be performed by ESA 100.

As shown, process 1100 may include applying (at 1110) fuzzing to a target binary and/or other embedded component.

Process 1100 may include monitoring (at 1120) results of the applied fuzzing and detecting test cases.

The process may include determining (at 1130) whether any diverted states were detected based on drilling applied during fuzzing at 1110.

As shown, process 1100 may include updating (at 1140) test cases based on any diverted states detected at 1130. Elements 1110-1140 may be repeated as additional test cases are identified and applied.

Process 1100 may include analyzing (at 1150) crashing test cases and saving results, if applicable.

As shown, process 1100 may include applying (at 1160) machine learning model(s) to the target binary results and detected test cases in order to prioritize the test cases. Such machine learning models may be trained using various appropriate data, such as default or initial test cases and associated feedback or other metric of effectiveness.

Figure 12:
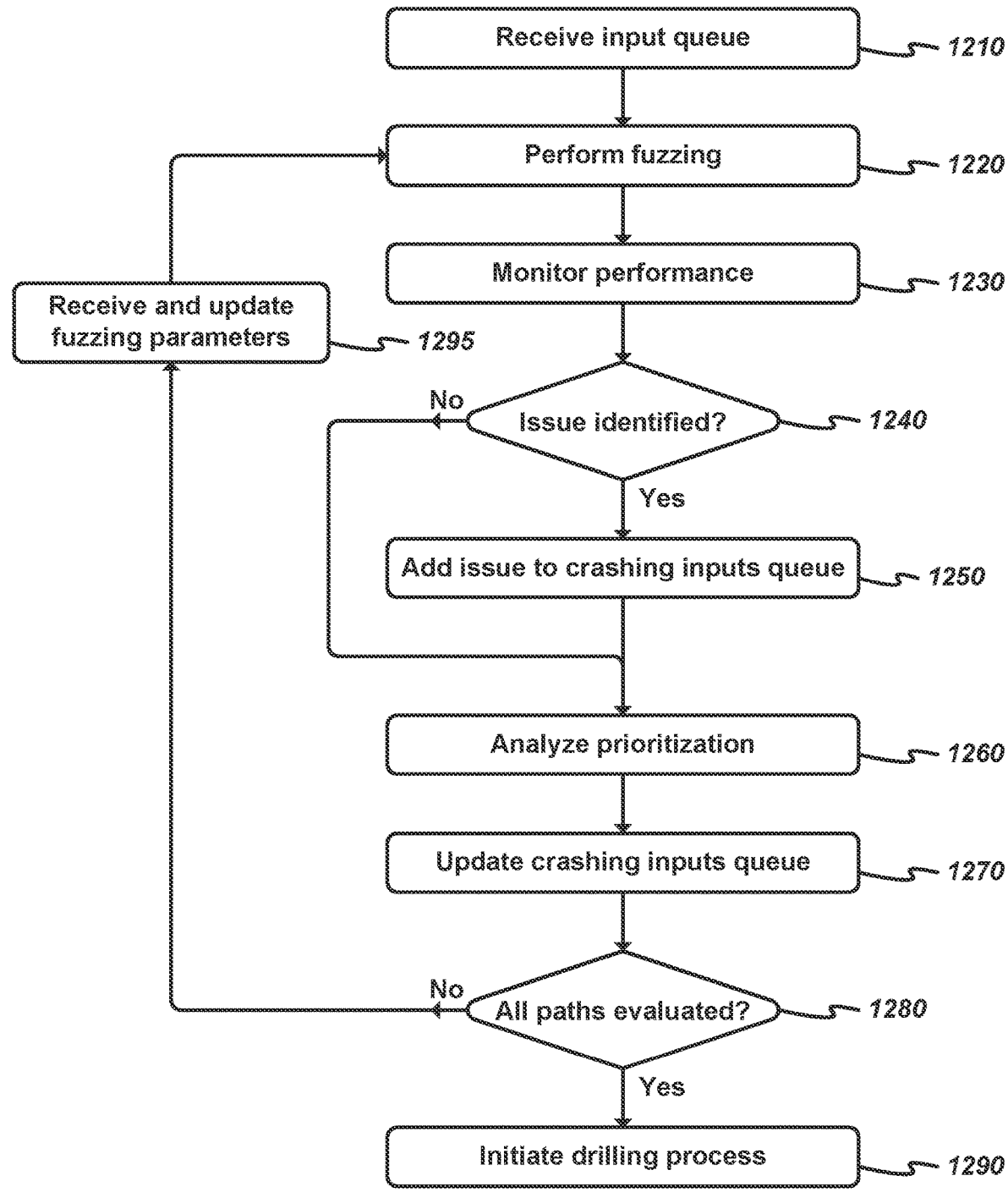
FIG. 12 illustrates a flow chart of an exemplary process that performs fuzzing analysis of a target binary.

FIG. 12 illustrates an example process 1200 for performing fuzzing analysis of a target binary. The process may be used to test various inputs and mutated inputs. Process 1200 may be performed when a target binary and seed are received and/or under other appropriate conditions. In some embodiments, process 1200 may be performed by ESA 100, and, more specifically, by fuzzer 440.

As shown, process 1200 may include receiving (at 1210) a fuzzing inputs queue. Such a fuzzing inputs queue may be similar to inputs queue 480 described above. Initially, the fuzzing inputs queue may include only the initial seed or seeds (if received with the target binary). The fuzzing inputs queue may be modified by the fuzzing process as new inputs are identified and/or evaluated. Other components and/or processes may update the fuzzing inputs queue. For instance, the fuzzing inputs queue may be updated by a driller, such as driller 430 described above.

Process 1200 may include performing (at 1220) fuzzing. Such fuzzing may include bombarding the inputs of target binary 110 with random (or partly random) data. During fuzzing, machine learning may be applied to improve test case mutation, seed generation, and/or other attributes of fuzzing performance. Fuzzing may be performed based on each input the fuzzing inputs queue and/or other appropriate resources.

The process may include monitoring (at 1230) performance as the inputs are fuzzed. Such performance monitoring may include, for instance, identifying crashes, hangs, and/or other performance issues, identifying memory vulnerabilities, etc. Performance data may be associated with a bitmap or other appropriate data structure or format.

As shown, process 1200 may include determining (at 1240) whether any issues have been identified. Such a determination may be made based on the performance monitoring. Issues may be defined in various appropriate ways. For instance, some embodiments may only consider whether a crash has occurred and ignore other types of performance issues, such as hangs or memory vulnerabilities.

In some embodiments, process 1200 may monitor performance and identify additional test cases for fuzzing analysis based on the performance monitoring. Such test cases may be added to the fuzzing inputs queue. For instance, inputs similar to an input associated with a crash If process 1200 determines (at 1240) that an issue has been identified, process 1200 may include adding (at 1250) the issue to a crashing inputs queue such as the crashing inputs queue 210, and/or other appropriate data structures or resources.

The process may include analyzing (at 1260) prioritization of the elements in the crashing inputs queue. As described above, such analysis may include calculating a vulnerability score for each basic block and using the vulnerability scores to generate fitness scores for the various paths including the basic blocks.

As shown, process 1200 may include updating (at 1270) the crashing inputs queue based on the prioritization analysis. For example, the crashing inputs queue may be sorted based on the fitness scores described above.

Process 1200 may include determining (at 1280) whether all paths have been evaluated. Such a determination may be made based on analysis of a resource such as the fuzzing inputs queue.

If process 1200 determines (at 1280) that all paths have been evaluated, the process may include initiating (at 1290) a drilling process. Process 1300 described below is an example of one such process. The drilling process may identify new test cases and add such test cases to the fuzzing inputs queue such that fuzzing may be continued using the newly identified test cases.

Process 1200 may include receiving and updating (at 1295) fuzzing parameters. Such parameters may include model information used to generate or evaluate inputs. Updated fuzzing parameters may include retrieval of a next input from the fuzzing inputs queue. In some embodiments, additional fuzzing inputs may be identified and added to the fuzzing inputs queue.

Figure 13:
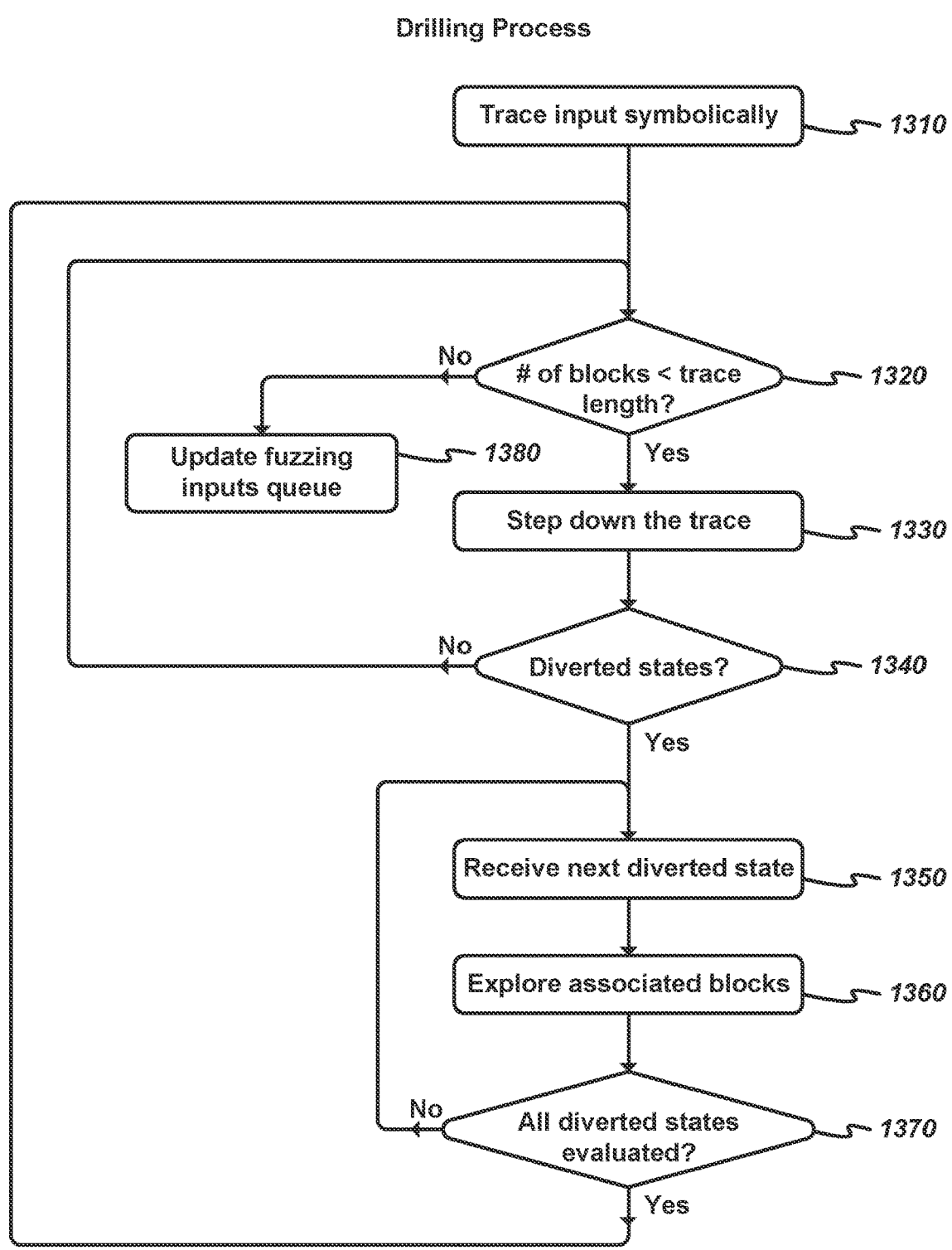
FIG. 13 illustrates a flow chart of an exemplary process that performs drilling analysis of a target binary.

FIG. 13 illustrates an example process 1300 for performing drilling analysis of a target binary. The process may be used to identify additional test cases or otherwise identify relevant inputs or paths. The process may be performed while the fuzzing process is performed or based on some criteria, such as lack of available paths in the fuzzing inputs queue for evaluation with the fuzzing process. In some embodiments, process 1300 may be performed by ESA 100, and specifically by driller 430.

As shown, process 1300 may include tracing (at 1310) the input symbolically using information from the bitmap. Such tracing may include identification of basic blocks, connections between blocks, and/or other symbolic associations along the input path. Such symbolic tracing may be performed using a resource such as a dynamic binary instrumentation framework.

Process 1300 may include determining (at 1320) if the number of basic blocks that have been evaluated is less than the trace length. Such a determination may be made based on the symbolic input tracing, bitmap, and/or other relevant information (e.g., analysis of the target binary provided by a dynamic binary instrumentation framework).

If process 1300 determines (at 1320) that the number of basic blocks that have been evaluated is less than the trace length, the process may include stepping (at 1330) down the trace.

Stepping down the trace may include identifying each basic block address along the input path.

As shown, process 1300 may include determining (at 1340) whether any diverted states were identified. Diverted states may include basic block addresses that are not in the input path. The determination may be made by comparing the trace results to a listing of basic block addresses, which may be provided by a resource such as the dynamic binary instrumentation framework.

If the process determines (at 1340) that diverted states were identified, process 1300 may include receiving (at 1350) the next diverted state. The next diverted state may be retrieved from a resource such as a lookup table or other data structure generated when stepping down the trace.

The process may include exploring (at 1360) associated blocks. Such exploring may include limited symbolic exploration in order to perform complex checks that fuzzing is unlikely or unable to perform. Such exploration may include identifying connected blocks (e.g., inputs or outputs of the diverted state block) and determining whether any associated blocks are relevant to the diverted state (e.g., if an input to the diverted state produces invalid or improper data causing the diversion). Exploration of associated blocks may include use of fuzzing, drilling, and/or other appropriate operations or processes.

As shown, process 1300 may include determining (at 1370) whether all diverted states have been evaluated. Such a determination may be made based on review of the lookup table or other listing of diverted states. If the process determines (at 1370) that all diverted states have been evaluated, process 1300 may return to operation 1320. If the process determines (at 1370) that all diverted states have not been evaluated, process 1300 may return to operation 1350.

If process 1300 determines (at 1320) that the number of basic blocks is not less than the trace length, the process may include updating (at 1380) the fuzzing inputs queue. Such a determination may indicate that all blocks in the traced input have been evaluated. Newly found test cases may be added to the fuzzing inputs queue. Such test cases may be associated with diverted states, associated blocks, and/or other relevant inputs identified by the drilling process.

Figure 14:
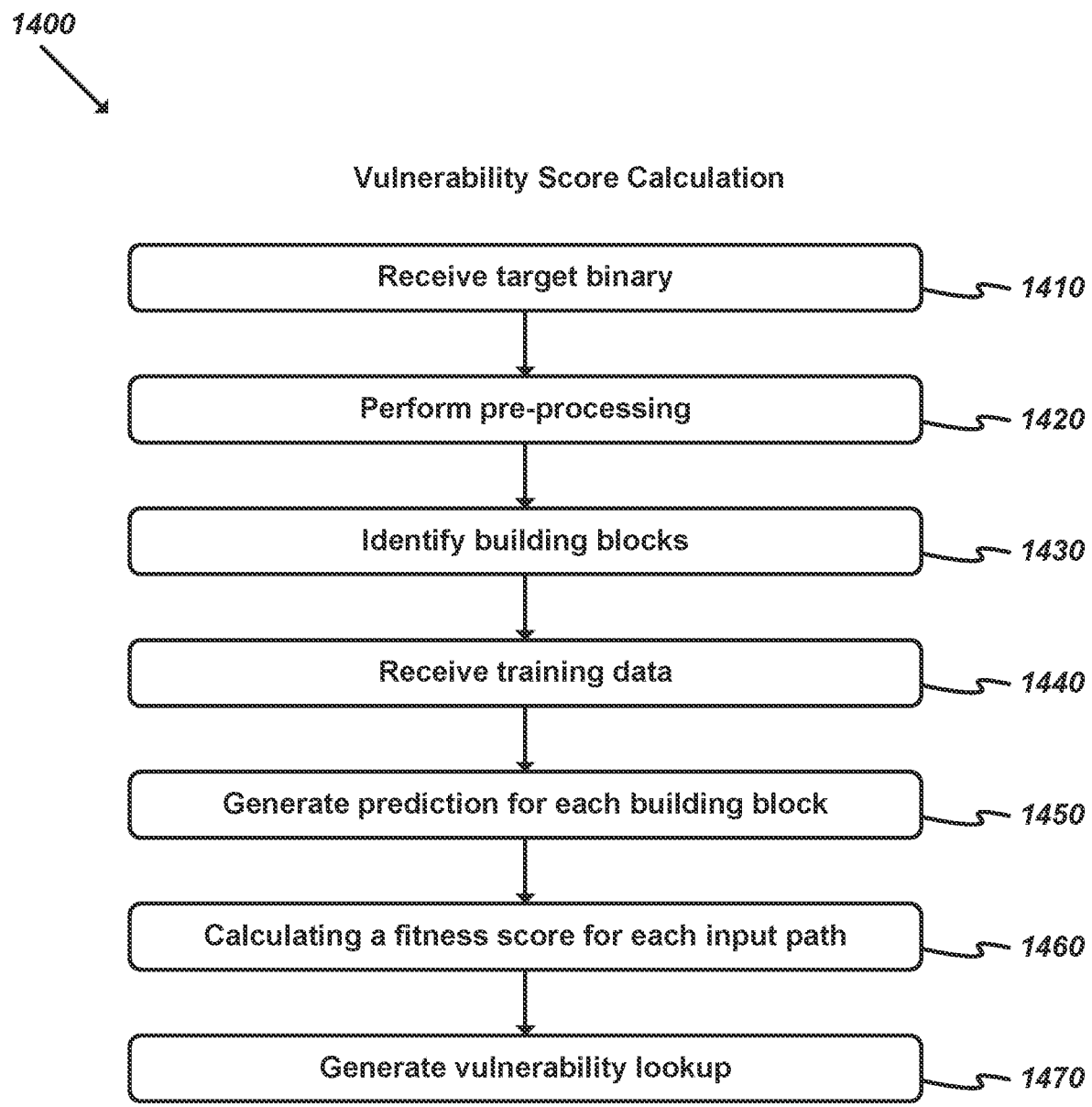
FIG. 14 illustrates a flow chart of an exemplary process that calculates vulnerability scores for basic blocks of a target binary.

FIG. 14 illustrates an example process 1400 for calculating vulnerability scores for basic blocks of a target binary. Vulnerability scores may indicate a probability of finding a vulnerability in a particular basic block and/or path. Such scoring may be used to prioritize test case evaluation such that inputs that are predicted to be more vulnerable are evaluated before those that are predicted to be less vulnerable, whereas typical fuzzing uses a first-in, first-out approach. The process may be performed before fuzzing or drilling. In some embodiments, process 1400 may be performed by ESA 100, and specifically by interface/controller 410.

As shown, process 1400 may include receiving (at 1410) a target binary, such as target binary 110. The target binary may be received in various appropriate ways. For instance, the target binary may be copied to a directory or other file structure associated with the ESA 100. As another example, an address or filename may be used to retrieve the file.

Process 1400 may include performing (at 1420) pre-processing. Such pre-processing may include formatting or analysis performed by a resource such as a dynamic binary instrumentation framework, such as dynamic framework 450.

The process may include identifying (at 1430) building blocks. A resource such as the dynamic binary instrumentation framework may be used to identify the basic building blocks of the target binary.

As shown, process 1400 may include receiving (at 1440) training data. Such training data may include programs with known vulnerabilities. In some embodiments, Juliet 1.3 training data may be utilized. Training data may be received as updates are made or new test cases added (e.g., training may be updated based on the next revision of the Juliet test suite).

Process 1400 may include generating (at 1450) a prediction for each building block. The prediction may be generated using various machine learning models. Each prediction may be a probability (e.g., a value from zero to one) indicating the predicted likelihood of a vulnerability being identified in the building block.

The process may include calculating (at 1460) a fitness score for each input path. Block vulnerability scores may be summed or averaged (and/or otherwise combined) along an input path to generate a fitness score of the path. The fitness score may indicate the likelihood of identifying a vulnerability along the path.

As shown, process 1400 may include generating (at 1470) a vulnerability lookup. Such a lookup may include a listing of input paths and associated fitness scores. The vulnerability lookup may be used by resources such as fuzzer 440 (and an embedded dynamic binary instrumentation framework in some embodiments) to prioritize evaluation of the inputs in the crashing inputs queue and/or fuzzing inputs queue, as appropriate.

Figure 15:
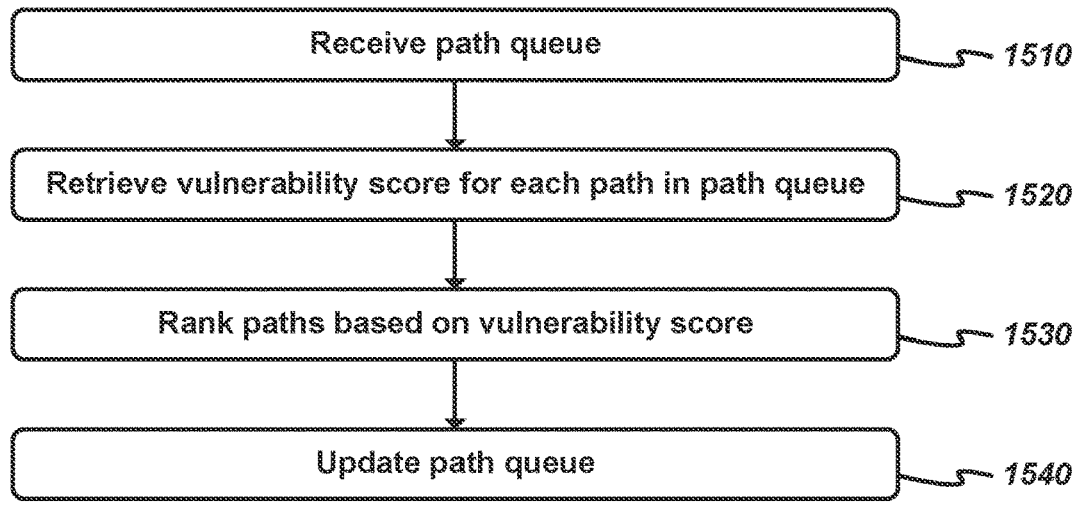
FIG. 15 illustrates a flow chart of an exemplary process that prioritizes path evaluation.

FIG. 15 illustrates an example process 1500 for prioritizing input path evaluation. Such a process may be used to enhance the efficiency of evaluation of the target binary by evaluating inputs that are more likely to be vulnerable before those that are less likely to be vulnerable. The process may be performed during fuzzing, as the fuzzing inputs queue is generated and/or updated. In some embodiments, process 1500 may be performed by ESA 100, and specifically by a resource such as fuzzer 440.

As shown, process 1500 may include receiving (at 1510) a path queue, such as fuzzing inputs queue 480. Such a path queue may be received via a specified directory, file path, and/or other appropriate ways. In some embodiments, each input path may be evaluated as it is generated (e.g., by the fuzzing and/or drilling processes).

Process 1500 may include retrieving (at 1520) a vulnerability score for each path in the path queue. The scores may be retrieved from a resource such as the vulnerability lookup generated by process 1400.

The process may include ranking (at 1530) paths based on the vulnerability scores. Ranking may include sorting or filtering the listing of paths. For instance, paths may be sorted by highest to lowest vulnerability score. Ranking may include associating paths with tiers or groups. Filtering may include removal of some paths from the path queue. For instance, any paths with vulnerability scores less than a specified threshold may be removed from the path queue or all paths in certain tiers may be removed from the path queue.

As shown, process 1500 may include updating (at 1540) the path queue. Based on the ranking and/or filtering, the path queue may be updated to reflect the updated ordering and/or content of the path queue. The path queue may be updated by updating a file or other data structure that is available to a resource such as fuzzer 440.

Figure 16:
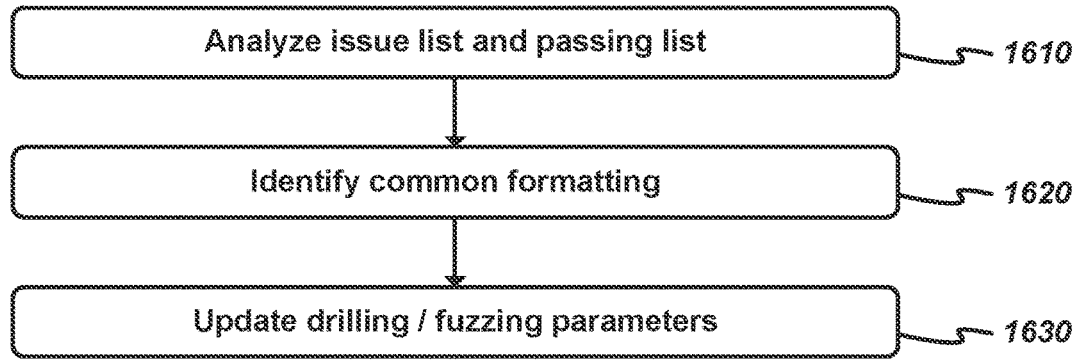
FIG. 16 illustrates a flow chart of an exemplary process that generates smart seeds for target binary analysis.

FIG. 16 illustrates an example process 1600 for generating smart seeds for target binary analysis. Such a process may allow fuzzing to be performed more efficiently by identifying input features such as formatting requirements. The process may be performed before or during fuzzing. In some embodiments, process 1600 may be performed by ESA 100, and specifically by fuzzer 440.

Process 1600 may be implemented using or via a GAN. Given a training set, a GAN learns to generate new data with the same statistics as the training set. For example, a GAN trained on photographs can generate new photographs that look at least superficially authentic to human observers. Similarly, such a GAN may be able to generate, for example, input seeds with valid formatting for a given target binary.

As shown, process 1600 may include analyzing (at 1610) the issue list and passing list. Such analysis may include analyzing inputs on the issue list (e.g., the crashing inputs queue 210), and also inputs on a passing list (e.g., all other evaluated inputs that are not on the issue list).

Process 1600 may include identifying (at 1620) common formatting. Such common formatting may be associated with seeds that do not cause early-execution or basic errors, such as invalid input format. Thus, for instance, in the image-processing example, valid input formats may be identified.

The process may include updating (at 1630) drilling and/or fuzzing parameters. Such updating may include, for instance, analyzing input mutations to determine whether newly-generated seeds are likely to be associated with limited execution errors and discarding such seeds.

Figure 17:
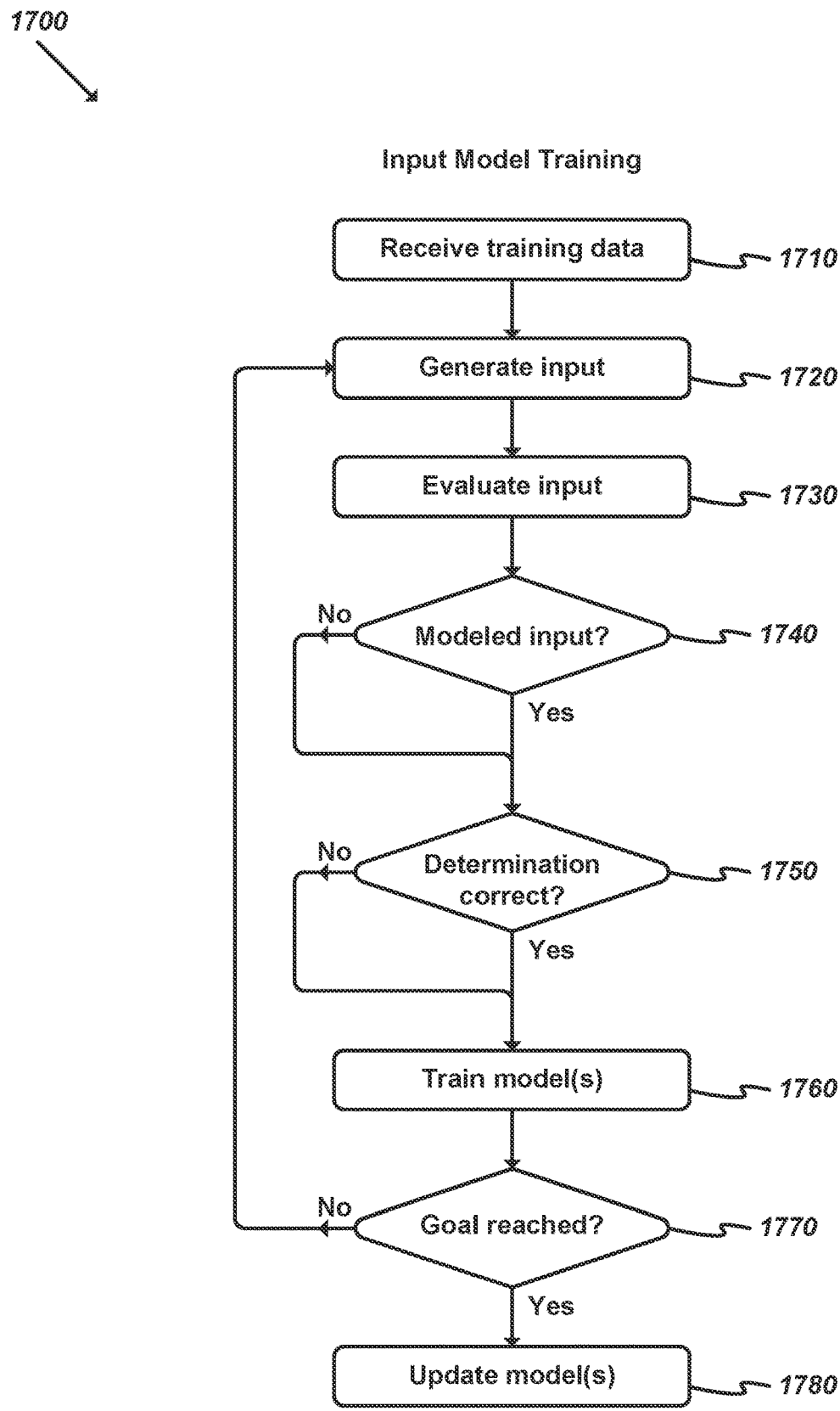
FIG. 17 illustrates a flow chart of an exemplary process that trains models used for input generation.

FIG. 17 illustrates an example process 1700 for training models used for input generation. Such input generation models may be used to generate and/or mutate input seeds for fuzzing. The process may be performed during fuzzing, as new training data becomes available, and/or under other appropriate conditions. In some embodiments, process 1700 may be performed by ESA 100, and specifically by a resource such as interface/controller 410.

Process 1700 may be implemented using or via a vulnerability prediction neural network (VPNN), where a VPNN may be a neural network trained to produce inputs to guide the fuzzing process. The training and evaluation of the network may be done via a collection of Python codes that leverage the PyTorch machine learning framework. The framework uses labelled datasets for training the neural network to detect whether a given function within a binary executable file is vulnerable. The resulting neural network may be utilized as a seed generator for the smart-seed capability within the fuzzer.

As shown, process 1700 may include receiving (at 1710) training data, such as training data 530. Such training data may be received from various appropriate resources and include various data sets (e.g., Juliet 1.3).

Process 1700 may include generating (at 1720) an input, such as test input 540. Such an input may be generated by an element such as input generator 510. In some iterations, an actual input may be selected from the training data (and/or other resource) rather than generated by the model.

The process may include evaluating (at 1730) the input. The input may be evaluated by an element such as input evaluator 520. Such evaluation may include analyzing basic blocks, connections, etc. associated with inputs in the issue list (e.g., the crashing inputs queue 210). Further, the issue type or other attributes may be used to identify relevant information. For instance, if an image processing program received input data that is not recognized as image data, an invalid input format or similar error may be identified very early in the program flow without exercising many blocks in the target binary.

As shown, process 1700 may include determining (at 1740) whether the input was generated by a model. Such a determination may be made based on the evaluation of the input at 1730. A flag or other resource may be set to indicate the result of the determination.

Process 1700 may include determining (at 1750) whether the determination made (at 1740) was correct. A resource such as interface/controller 410 may be aware of the input selection (e.g., whether the input was an actual input or generated by a model) and may indicate whether the determination at 1740 was correct or incorrect. A flag or other resource may be set to indicate the result of the determination.

The process may include training (at 1760) the models. Based on the determinations at 1740 and 1750, the models may be trained.

As shown, process 1700 may include determining (at 1770) whether a performance goal has been reached. As described above, the input generation and input evaluation models may be trained until the input evaluation is unable to distinguish between actual and modeled inputs.

If the process determines (at 1770) that the performance goal was reached, process 1700 may include updating (at 1780) the models. Updating the models may include releasing or copying the newly trained models to a resource such as a directory, file, etc.

If the process determines (at 1770) that the performance goal was not reached, the process may return to operation 1720 and continue training until the goal is reached.

Figure 18:
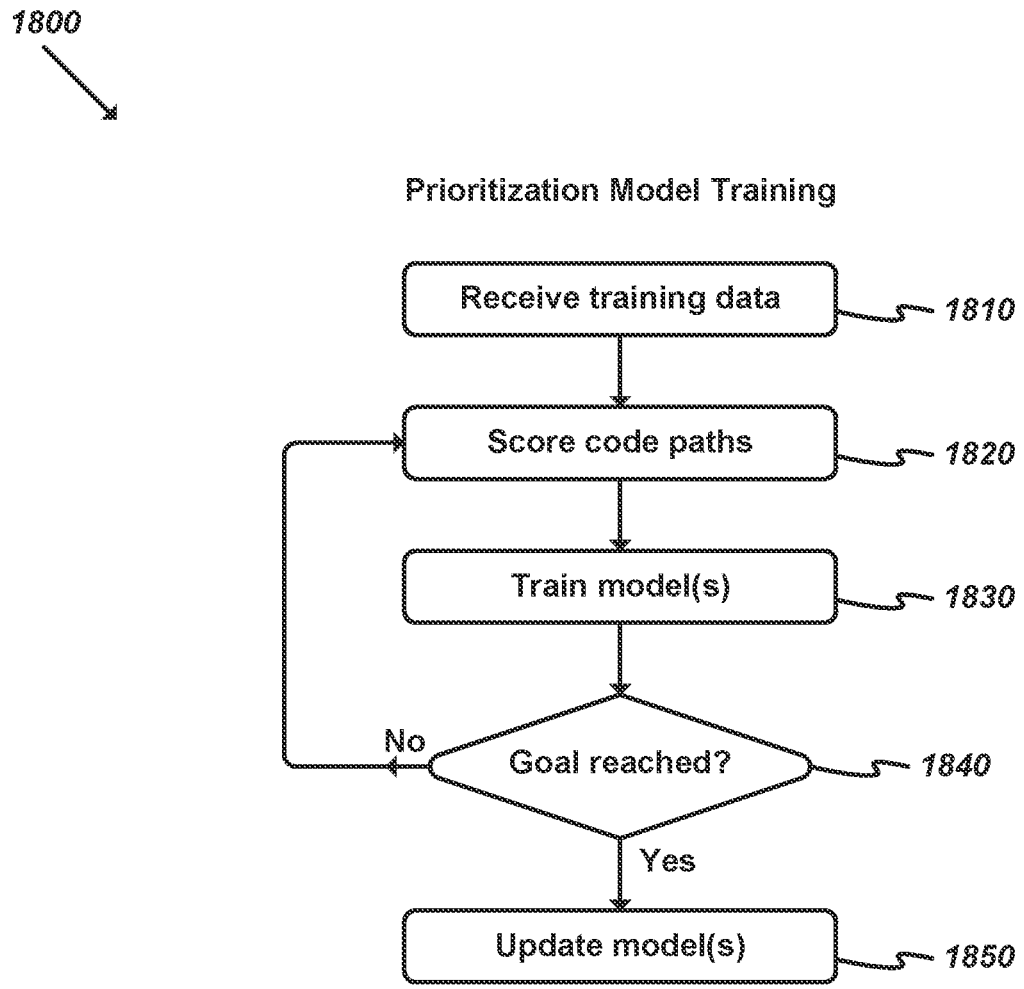
FIG. 18 illustrates a flow chart of an exemplary process that trains models used for calculating vulnerability scores.

FIG. 18 illustrates an example process 1800 for training models used for calculating vulnerability scores. Such vulnerability scores may be used to prioritize path evaluation. The process may be performed as training data becomes available. In some embodiments, process 1800 may be performed by ESA 100, and specifically by interface/controller 410.

As shown, process 1800 may include receiving (at 1810) training data. Training data, such as the Juliet test suite, may be received from various appropriate resources.

Process 1800 may include scoring (at 1820) code paths. Scoring may include generating a fitness score for each path by summing or averaging vulnerability scores of blocks along the path.

The process may include training (at 1830) models. Such training may include comparing the fitness and/or vulnerability scores to the results of actual vulnerability analysis (e.g., dynamic binary instrumentation framework analysis).

As shown, process 1800 may include determining (at 1840) whether a performance goal has been reached. Such a performance goal may include, for instance, a minimum fit threshold to the training data and/or other performance metrics.

If the process determines (at 1840) that the performance goal was reached, process 1800 may include updating (at 1850) the models. Such updating may include releasing or copying the models to a directory or file structure associated with ESA 100.

If the process determines (at 1840) that the performance goal was not reached, the process may return to operation 1820 and continue training until the goal is reached.

Figure 19:
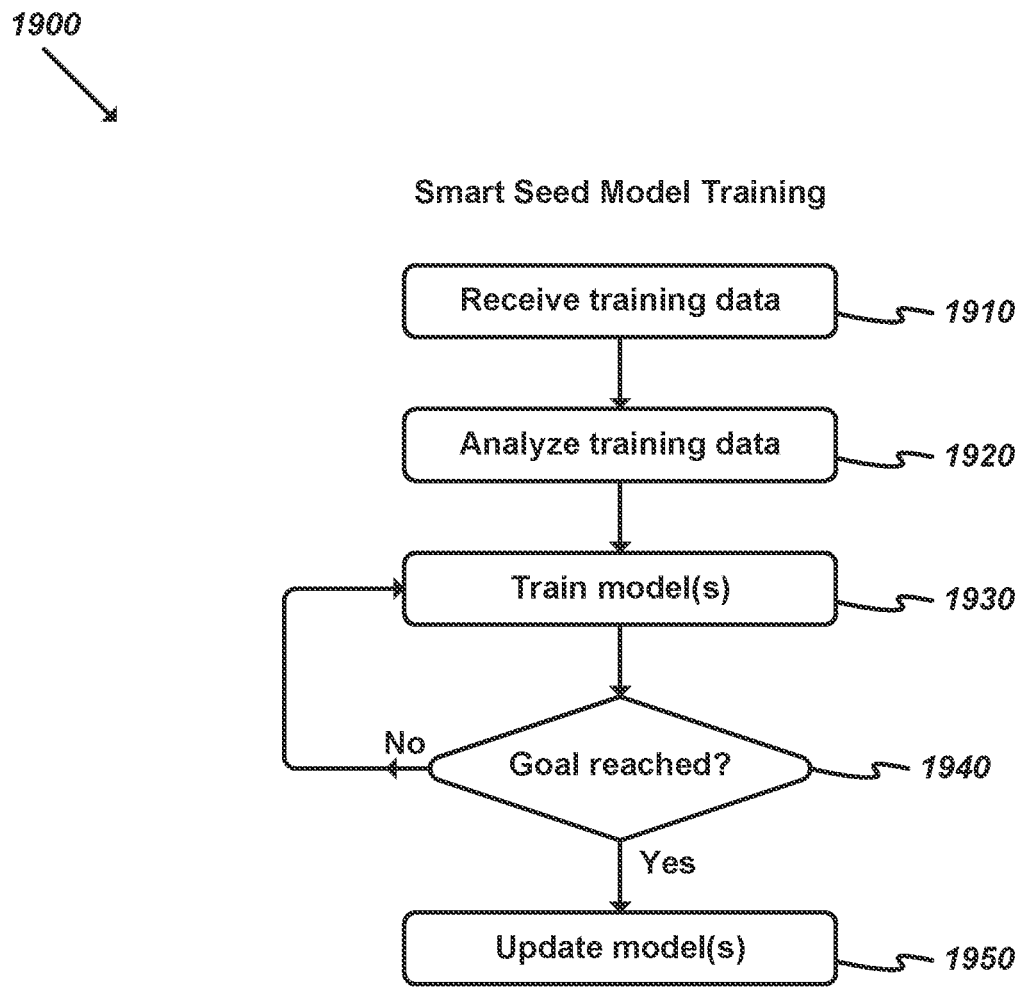
FIG. 19 illustrates a flow chart of an exemplary process that trains models used for generating smart seeds.

FIG. 19 illustrates an example process 1900 for training models used for generating smart seeds. As described above, such smart seeding may be used to avoid evaluating non-productive input paths, such as those associated with an invalid input format, which are unlikely to yield vulnerabilities. The process may be performed when training data becomes available. In some embodiments, process 1900 may be performed by ESA 100, and specifically by interface/controller 410.

As shown, process 1900 may include receiving (at 1910) training data. Training data may be received from various data structures or resources, and may be associated with results of a current fuzzing and/or drilling process.

Process 1900 may include analyzing (at 1920) the training data. Such analysis may include, for instance, associating input paths with error or issue types (e.g., labelling paths that are associated with an invalid input format error and paths that are not associated with the invalid input format error).

The process may include training (at 1930) the models. Such training may include, for instance, processing labeled path data.

As shown, process 1900 may include determining (at 1940) whether a performance goal has been reached. Such a performance goal may include, for instance, a minimum fit threshold to the training data and/or other performance metrics.

If the process determines (at 1940) that the performance goal was reached, process 1900 may include updating (at 1950) the models. Such updating may include releasing or copying the models to a directory or file structure associated with ESA 100.

If the process determines (at 1940) that the performance goal was not reached, the process may return to operation 1930 and continue training until the goal is reached.

One of ordinary skill in the art will recognize that processes 1100-1900 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 20:
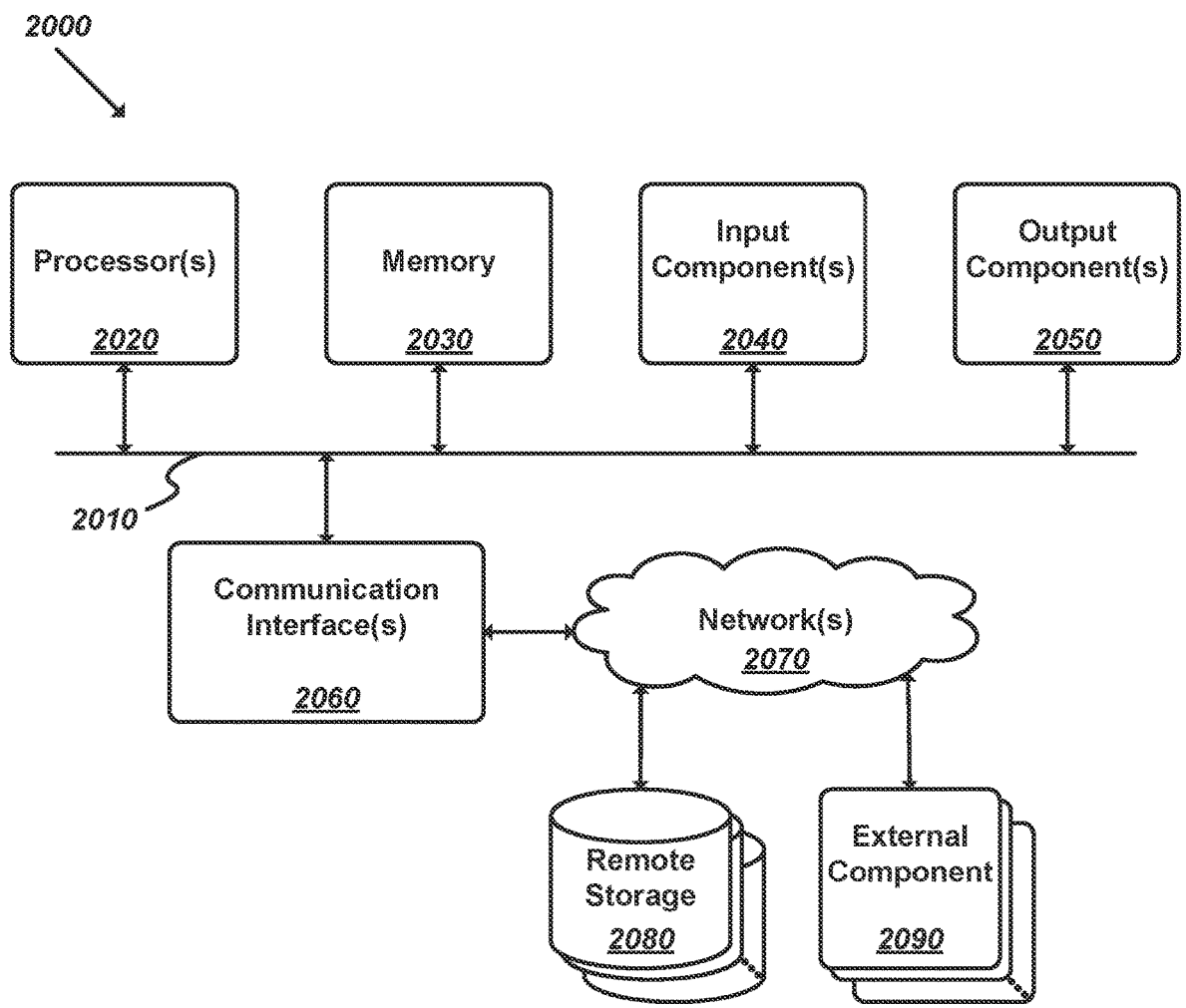
FIG. 20 illustrates a schematic block diagram of one or more exemplary devices used to implement various embodiments.

FIG. 20 illustrates a schematic block diagram of an exemplary device (or system or devices) 2000 used to implement some embodiments. For example, the components, devices, systems, and/or operations described above in reference to FIG. 1, FIG. 2, FIG. 3, FIG. 4, FIG. 5, FIG. 6, FIG. 7, FIG. 8, FIG. 9, and FIG. 10 may be at least partially implemented using device 2000. As another example, the processes described in reference to FIG. 11, FIG. 12, FIG. 13, FIG. 14, FIG. 15, FIG. 16, FIG. 17, FIG. 18, and FIG. 19 may be at least partially implemented using device 2000.

Device 2000 may be implemented using various appropriate elements and/or sub-devices. For instance, device 2000 may be implemented using one or more personal computers (PCs), servers, mobile devices (e.g., smartphones), tablet devices, wearable devices, and/or any other appropriate devices. The various devices may work alone (e.g., device 2000 may be implemented as a single smartphone) or in conjunction (e.g., some components of the device 2000 may be provided by a mobile device while other components are provided by a server).

As shown, device 2000 may include at least one communication bus 2010, one or more processors 2020, memory 2030, input components 2040, output components 2050, and one or more communication interfaces 2060.

Bus 2010 may include various communication pathways that allow communication among the components of device 2000. Processor 2020 may include a processor, microprocessor, microcontroller, digital signal processor, logic circuitry, and/or other appropriate processing components that may be able to interpret and execute instructions and/or otherwise manipulate data. Memory 2030 may include dynamic and/or non-volatile memory structures and/or devices that may store data and/or instructions for use by other components of device 2000. Such a memory device 2030 may include space within a single physical memory device or spread across multiple physical memory devices.

Input components 2040 may include elements that allow a user to communicate information to the computer system and/or manipulate various operations of the system. The input components may include keyboards, cursor control devices, audio input devices and/or video input devices, touchscreens, motion sensors, etc. Output components 2050 may include displays, touchscreens, audio elements such as speakers, indicators such as light-emitting diodes (LEDs), printers, haptic or other sensory elements, etc. Some or all of the input and/or output components may be wirelessly or optically connected to the device 2000.

Device 2000 may include one or more communication interfaces 2060 that are able to connect to one or more networks 2070 or other communication pathways. For example, device 2000 may be coupled to a web server on the Internet such that a web browser executing on device 2000 may interact with the web server as a user interacts with an interface that operates in the web browser.

Device 2000 may be able to access one or more remote storages 2080 and one or more external components 2090 through the communication interface 2060 and network 2070. The communication interface(s) 2060 may include one or more application programming interfaces (APIs) that may allow the device 2000 to access remote systems and/or storages and also may allow remote systems and/or storages to access device 2000 (or elements thereof).

It should be recognized by one of ordinary skill in the art that any or all of the components of computer system 2000 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 2000 may perform various operations in response to processor 2020 executing software instructions stored in a computer-readable medium, such as memory 2030. Such operations may include manipulations of the output components 2050 (e.g., display of information, haptic feedback, audio outputs, etc.), communication interface 2060 (e.g., establishing a communication channel with another device or component, sending and/or receiving sets of messages, etc.), and/or other components of device 2000.

The software instructions may be read into memory 2030 from another computer-readable medium or from another device. The software instructions stored in memory 2030 may cause processor 2020 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

We claim:

1. A device, comprising:
   one or more embedded software analyzers configured to:
      receive a target binary and an initial input seed;
      generate fuzzed inputs to the target binary based on the initial input seed;
      identify fuzzed inputs associated with a crash;
      save a listing of the fuzzed inputs associated with the crash;
      identify additional input seeds by:
         generating a trace of each input in the listing of the bug type associated with each input;
         stepping down the trace;
         identifying diverted states along the trace;
         saving the diverted states as additional input seeds;
      identify basic building blocks of the target binary;
      generate a vulnerability score for each basic building block of the target binary;
      calculate a fitness score for each input path of the target binary by averaging or summing the vulnerability scores;
      generate a lookup including each input path and the associated fitness score;
      retrieve the fitness score for each additional input seed; and
      prioritize analysis of each additional input seed based on the fitness score.

2. The device of claim 1, the one or more embedded software analyzers further configured to:
   analyze, using a dynamic binary instrumentation framework, each input in the listing of fuzzed inputs associated with the crash;
   identify a bug type associated with each input; and
   save a listing of the bug type associated with each input.

3. The device of claim 1, the one or more embedded software analyzers further configured to identify additional input seeds by:
   identifying common formatting among fuzzed inputs associated with early execution failure; and
   training an input generation module that generates fuzzed inputs based on the common formatting.

4. The device of claim 1, wherein the target binary is associated with an embedded software item.

5. The device of claim 1, wherein calculating the fitness score and prioritizing analysis is based at least partly on a machine learning model.

6. A non-transitory computer-readable medium, storing a plurality of processor executable instructions to:
   receive a target binary and an initial input seed;
   generate fuzzed inputs to the target binary based on the initial input seed;
   identify fuzzed inputs associated with a crash;
   save a listing of the fuzzed inputs associated with the crash;
   identify additional input seeds by:
      generating a trace of each input in the listing of the bug type associated with each input;
      stepping down the trace;
      identifying diverted states along the trace;
      saving the diverted states as additional input seeds;
   identify basic building blocks of the target binary;
   generate a vulnerability score for each basic building block of the target binary;
   calculate a fitness score for each input path of the target binary by averaging or summing the vulnerability scores;
   generate a lookup including each input path and the associated fitness score;
   retrieve the fitness score for each additional input seed; and
   prioritize analysis of each additional input seed based on the fitness score.

7. The non-transitory computer-readable medium of claim 6, the plurality of processor executable instructions further to:
   analyze, using a dynamic binary instrumentation framework, each input in the listing of fuzzed inputs associated with the crash;
   identify a bug type associated with each input; and
   save a listing of the bug type associated with each input.

8. The non-transitory computer-readable medium of claim 6, the plurality of processor executable instructions further to identify additional input seeds by:
  identifying common formatting among fuzzed inputs associated with early execution failure; and
  training an input generation module that generates fuzzed inputs based on the common formatting.

9. The non-transitory computer-readable medium of claim 6, wherein the target binary is associated with an embedded software item.

10. The method of claim 6, wherein calculating the fitness score and prioritizing analysis is based at least partly on a machine learning model.

11. A method comprising
  receiving, at an embedded software analyzer, a target binary and an initial input seed;
  generating, at the embedded software analyzer, fuzzed inputs to the target binary based on the initial input seed;
  identifying, at the embedded software analyzer, fuzzed inputs associated with a crash ;
  saving a listing of the fuzzed inputs associated with the crash;
  identifying, at the embedded software analyzer, additional input seeds by:
    generating, at the embedded software analyzer, a trace of each input in the listing of the bug type associated with each input;
    stepping, at the embedded software analyzer, down the trace;
    identifying, at the embedded software analyzer, diverted states along the trace;
    saving, at the embedded software analyzer, the diverted states as additional input seeds;
  identifying basic building blocks of the target binary;
  generating, at the embedded software analyzer, a vulnerability score for each basic building block of the target binary;
  calculating, at the embedded software analyzer, a fitness score for each input path of the target binary by averaging or summing the vulnerability scores;
  generating, at the embedded software analyzer, a lookup including each input path and the associated fitness score;
  retrieving, at the embedded software analyzer, the fitness score for each additional input seed; and
  prioritizing, at the embedded software analyzer, analysis of each additional input seed based on the fitness score.

12. The method of claim 11 further comprising:
  analyzing, at the embedded software analyzer, using a dynamic binary instrumentation framework, each input in the listing of fuzzed inputs associated with the crash;
  identifying, at the embedded software analyzer, a bug type associated with each input; and
  saving, at the embedded software analyzer, a listing of the bug type associated with each input.

13. The method of claim 11 further comprising identifying additional input seeds by:
  identifying, at the embedded software analyzer, common formatting among fuzzed inputs associated with early execution failure; and
  training, at the embedded software analyzer, an input generation module that generates fuzzed inputs based on the common formatting.

14. The method of claim 11, wherein calculating the fitness score and prioritizing analysis is based at least partly on a machine learning model.

15. The method of claim 11, wherein the target binary is associated with an embedded software item.

* * * * *